(12) United States Patent
Sasaki et al.

(10) Patent No.: US 12,307,734 B2
(45) Date of Patent: May 20, 2025

(54) INFORMATION PROCESSING APPARATUS, METHOD, AND COMPUTER-READABLE MEDIUM

(71) Applicant: CANON KABUSHIKI KAISHA, Tokyo (JP)

(72) Inventors: Takeru Sasaki, Kanagawa (JP); Hiromitsu Yamaguchi, Kanagawa (JP); Akitoshi Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 17/814,799

(22) Filed: Jul. 25, 2022

(65) Prior Publication Data

US 2023/0045024 A1 Feb. 9, 2023

(30) Foreign Application Priority Data

Jul. 27, 2021 (JP) .................. 2021-122663

(51) Int. Cl.
*G06V 10/60* (2022.01)
*G06V 10/141* (2022.01)

(52) U.S. Cl.
CPC ............ *G06V 10/60* (2022.01); *G06V 10/141* (2022.01)

(58) Field of Classification Search
CPC .. G06V 10/141; G06V 10/60; H04N 1/00801; H04N 1/19594; H04N 1/32309; H04N 1/40056
See application file for complete search history.

(56) References Cited

U.S. PATENT DOCUMENTS

| 10,783,601 | B1* | 9/2020 | Rodriguez | ............ G06T 1/0028 |
| 2015/0253428 | A1* | 9/2015 | Holz | ........................ G01S 7/483 |
| | | | | 356/5.01 |
| 2016/0275326 | A1* | 9/2016 | Falkenstern | ......... G07D 7/0034 |
| 2016/0275639 | A1* | 9/2016 | Holub | ................ H04N 1/32352 |
| 2017/0024840 | A1* | 1/2017 | Holub | .................. G06T 1/0028 |

(Continued)

FOREIGN PATENT DOCUMENTS

| JP | S59033447 A | 2/1984 |
| JP | 2007104471 A | 4/2007 |

(Continued)

OTHER PUBLICATIONS

Petar Pjanic et al.,"Paxel: A Generic Framework to Superimpose High-Frequency Print Patterns Using Projected Light," Apr. 6, 2018, IEEE Transactions on Image Processing, vol. 27, No. 7, Jul. 2018,pp. 3541-3551.*

(Continued)

*Primary Examiner* — Omar S Ismail
(74) *Attorney, Agent, or Firm* — Canon U.S.A., Inc. IP Division

(57) ABSTRACT

An apparatus comprises at least one processor; at least one memory storing at least one program; a light source; and a capturing unit configured to acquire image data by capturing an image formed on a medium, wherein the program, when executed by the processor, causes the processor to extract information multiplexed in the image from an image captured by the capturing unit, adjust the light amount of the light source to a light amount that accords with a reflection intensity of the medium on which the image is formed, capture the image, and extract information from the image.

17 Claims, 28 Drawing Sheets

(56) References Cited

U.S. PATENT DOCUMENTS

| | | | | |
|---|---|---|---|---|
| 2017/0061563 | A1* | 3/2017 | Falkenstern | C09D 11/50 |
| 2017/0198329 | A1* | 7/2017 | Ayyub | G01N 33/6893 |
| 2020/0015905 | A1* | 1/2020 | Scheib | A61B 90/30 |
| 2020/0284883 | A1* | 9/2020 | Ferreira | G01S 17/10 |

FOREIGN PATENT DOCUMENTS

| | | |
|---|---|---|
| JP | 2014039103 A | 2/2014 |
| JP | 2016055463 A | 4/2016 |

OTHER PUBLICATIONS

Zhiyuan Ye et al.,"Image watermarking and fusion based on Fourier single-pixel imaging with weighed light source," Nov. 27, 2019,Optics Express, vol. 27, No. 25,Dec. 9, 2019,pp. 36505-36520.*

R. A. Lee,"7 Micromanufacturing for Document Security:Optically Variable Devices," Book-Micromanufacturing and Nanotechnology,2006,pp. 135-164.*

Basak Oztan et al.,"Per-separation clustered-dot color halftone watermarks: separation estimation based on spatial frequency content," Dec. 16, 2010, Journal of Electronic Imaging 19(4),pp. 043007-1-043007-18.*

* cited by examiner

FIG. 5

COLOR CORRECTION TABLE

| (R,G,B) | DeviceRGB(R,G,B) |
|---|---|
| (0,0,0) | (0,0,0) |
| (0,0,16) | (0,0,10) |
| (0,0,32) | (0,3,28) |
| ⋮ | ⋮ |
| ⋮ | ⋮ |
| (255,255,240) | (248,255,230) |
| (255,255,255) | (255,255,255) |

FIG. 7
COLOR SEPARATION TABLE
| (R,G,B) | (C,M,Y,K) |
|---|---|
| (0,0,0) | (0,0,0,255) |
| (0,0,16) | (18,16,0,246) |
| (0,0,32) | (33,31,0,224) |
| ⋮ | ⋮ |
| ⋮ | ⋮ |
| (255,255,240) | (0,0,15,0) |
| (255,255,255) | (0,0,0,0) |
FIG. 8
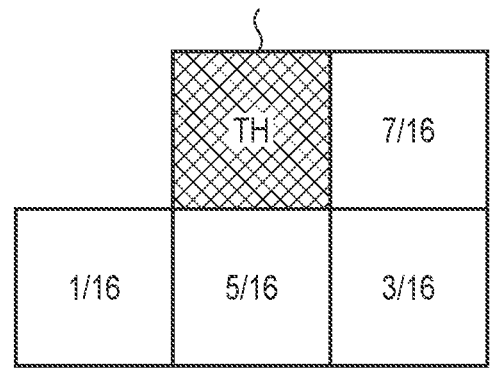
SCANNING DIRECTION

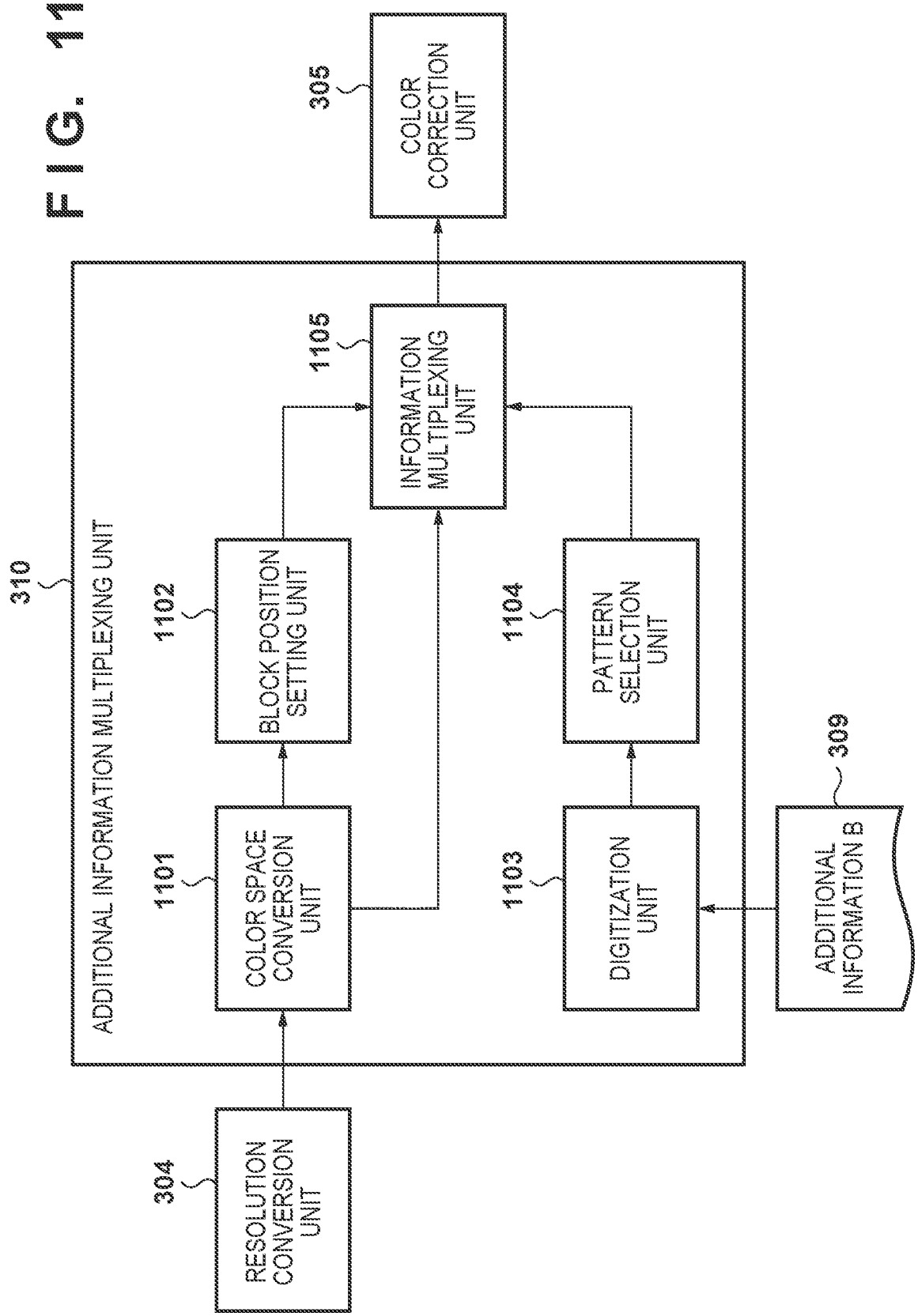

| 0 | 0 | 0 | -1 | -1 |
|---|---|---|---|---|
| 0 | -1 | -1 | 2 | 2 |
| -1 | 2 | 2 | -1 | -1 |
| 2 | -1 | -1 | 0 | 0 |
| -1 | 0 | 0 | 0 | 0 |

| 0 | 0 | -1 | 2 | -1 |
|---|---|---|---|---|
| 0 | 0 | -1 | 2 | -1 |
| 0 | -1 | 2 | -1 | 0 |
| 0 | -1 | 2 | -1 | 0 |
| -1 | 2 | -1 | 0 | 0 |

COLOR IMAGE

METALLIC COLOR IMAGE 1802C  1802M  1802Y  1802Me

INFORMATION PROCESSING APPARATUS, METHOD, AND COMPUTER-READABLE MEDIUM

BACKGROUND

Technical Field

The aspect of the embodiments relates to an information processing apparatus, an information processing method, and a computer-readable medium for extracting additional information embedded in a printed image.

Description of the Related Art

A digital watermark technique in which additional information related to an image is multiplexed over image information is known. In the digital watermark technique, for example, additional information such as an author's name and license permission is multiplexed over image information such as a photograph or a painting so as to be difficult to visually discriminate. In addition, with improvements in image quality of image output devices such as copy machines and printers, a technique in which additional information is embedded in an image for specifying an output device and its device number from an image outputted on paper in order to prevent counterfeiting of bills, stamps, securities, and the like is known as an application field.

Further, for extracting additional information embedded in an image outputted on paper, a technique for extracting embedded information by capturing target output matter using an image capturing device such as a scanner or an internal camera of a portable terminal and then analyzing the captured image is also known (Japanese Patent Laid-Open No. 2007-104471).

Meanwhile, in printing by an inkjet printing apparatus using a metallic color ink containing metal particles, it is possible to impart a metallic gloss on printed matter. By superimposing conventional color ink on such metallic color ink, metallic color printed matter can be outputted.

Japanese Patent Laid-Open No. 2016-55463 discloses a method for realizing a metallic color representation by applying metallic color ink as a base on a printing medium by ejecting ink while moving a print head in a main scanning direction and then applying color ink thereon.

When extracting additional information embedded in an image outputted on paper, the embedded additional information is extracted by irradiating printed matter with light and then analyzing a captured image obtained by capturing reflected light. However, respective reflection characteristics of a region on which an image has been formed only with color ink on a paper surface (hereinafter referred to as a color region) and a region on which an image has been formed with only metallic color ink or metallic color ink and color ink (hereinafter referred to as a metallic color region) are different. More specifically, a reflection intensity of a color region is smaller than a reflection intensity of a metallic color region.

Therefore, when extracting additional information embedded in a color region and additional information embedded in a metallic color region, respectively, it is difficult to extract both from an image captured by irradiating a luminous flux with the same amount of light.

SUMMARY

According to one aspect of the embodiments, an apparatus comprising: at least one processor; at least one memory storing at least one program; a light source; and a capturing unit configured to acquire image data by capturing an image formed on a medium, wherein the program, when executed by the processor, causes the processor to: extract information multiplexed in the image from an image captured by the capturing unit, adjust the light amount of the light source to a light amount that accords with a reflection intensity of the medium on which the image is formed, capture the image, and extract information from the image is provided.

Further features of the disclosure will become apparent from the following description of exemplary embodiments with reference to the attached drawings.

BRIEF DESCRIPTION OF THE DRAWINGS

FIG. 5 is a diagram illustrating an example of a color correction table.

FIG. 7 is a diagram illustrating an example of a color separation table.

FIG. 8 is a diagram for explaining an error diffusion method.

FIG. 11 is a block diagram of a multiplexing unit.

DESCRIPTION OF THE EMBODIMENTS

Figure 1A:
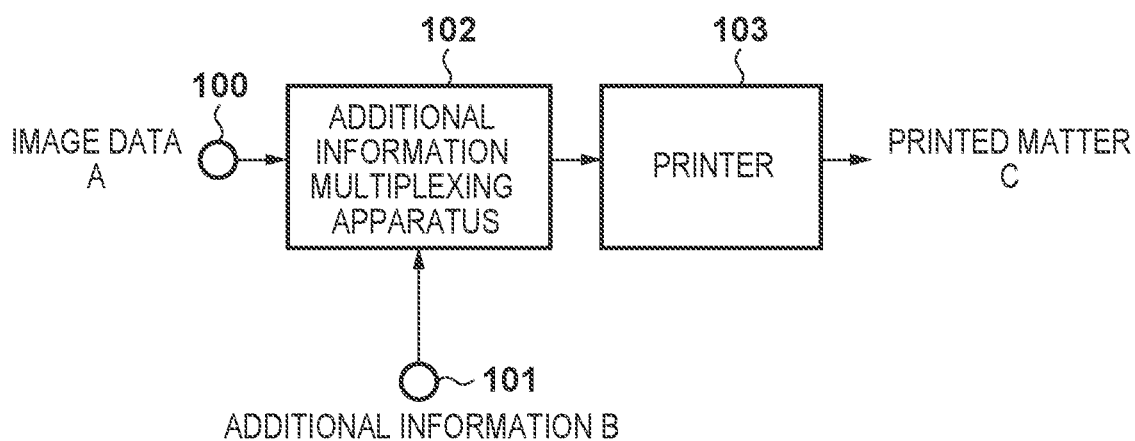
FIGS. 1A and FIG. 1B are diagrams illustrating examples of a configuration of a multiplexing encoding processing unit.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

An information processing system according to a first embodiment of the disclosure includes a multiplexing encoding processing unit that embeds additional information in image information and a multiplexing decoding processing unit that extracts additional information from a captured image. In the following, a description will be given separately for a basic configuration of the information processing system and a characteristic configuration of the information processing system (in particular, a configuration of the multiplexing decoding processing unit).

Figure 1B:
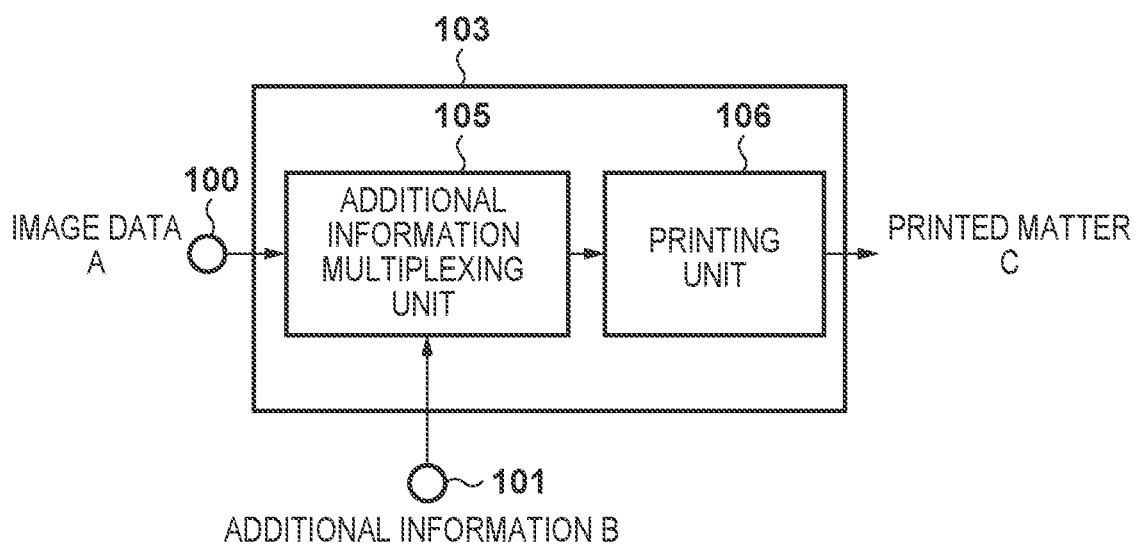

(1) Basic Configuration (1-1) Hardware of Multiplexing Encoding Processing Unit and Multiplexing Decoding Processing Unit FIG. 1A and FIG. 1B are diagrams for explaining an example of a configuration of hardware (a multiplexing encoding processing unit) for multiplexing encoding in which additional information (referred to as "multiplexed information" or "embedded information") is embedded in image information in the information processing system. This hardware acquires image data (image information) A and additional data (additional information) B and generates printed matter C in which the information A and B are embedded. The hardware of FIG. 1A is configured to perform a process of embedding the additional information B in the image data A by an apparatus different from a printer (a printing apparatus). The hardware of FIG. 1B is configured to perform a process of embedding the additional information B in the image data A in a printer (a printing apparatus).

In the configuration of FIG. 1A, the image data A inputted from an input terminal 100 is multi-tone image data including a color component. The additional information B inputted from an input terminal 101 is, for example, text document data, audio data, video data; data in which text document information, audio information, images, and video information have been compressed; or data converted into other binary values. An additional information multiplexing apparatus 102 performs processing (also referred to as "multiplexing processing" or "embedding processing") for embedding the additional information B in the image data A, as will be described later. A printer (a printing apparatus) 103 generates printed matter C by a printing operation based on the image data A in which the additional information B is embedded. The additional information multiplexing apparatus 102 can be implemented, for example, by executing a multiplexing processing program on a general-purpose computer.

In the configuration of FIG. 1B, an additional information multiplexing unit 105 corresponding to the multiplexing apparatus 102 of FIG. 1A is included in the printer 103. Similarly to the configuration of FIG. 1A, the image data A is inputted from the input terminal 100 and the additional information B is inputted from the input terminal 101. The additional information multiplexing unit 105 in the printer 103 performs processing for embedding the additional information B in the image data A. A printing unit 106 in the printer 103 generates the printed matter C by a printing operation based on the image data A in which the additional information B is embedded. Processing for generating the printed matter C based on the image data A in which the additional information B is embedded in this manner is also referred to as "multiplexing encoding processing". Alternatively, processing for embedding additional information in image data and printing an image is sometimes called multiplexing encoding processing (or encoding processing). The additional information multiplexing unit 105 can be implemented, for example, by executing a multiplexing processing program on a processor.

Figure 2:
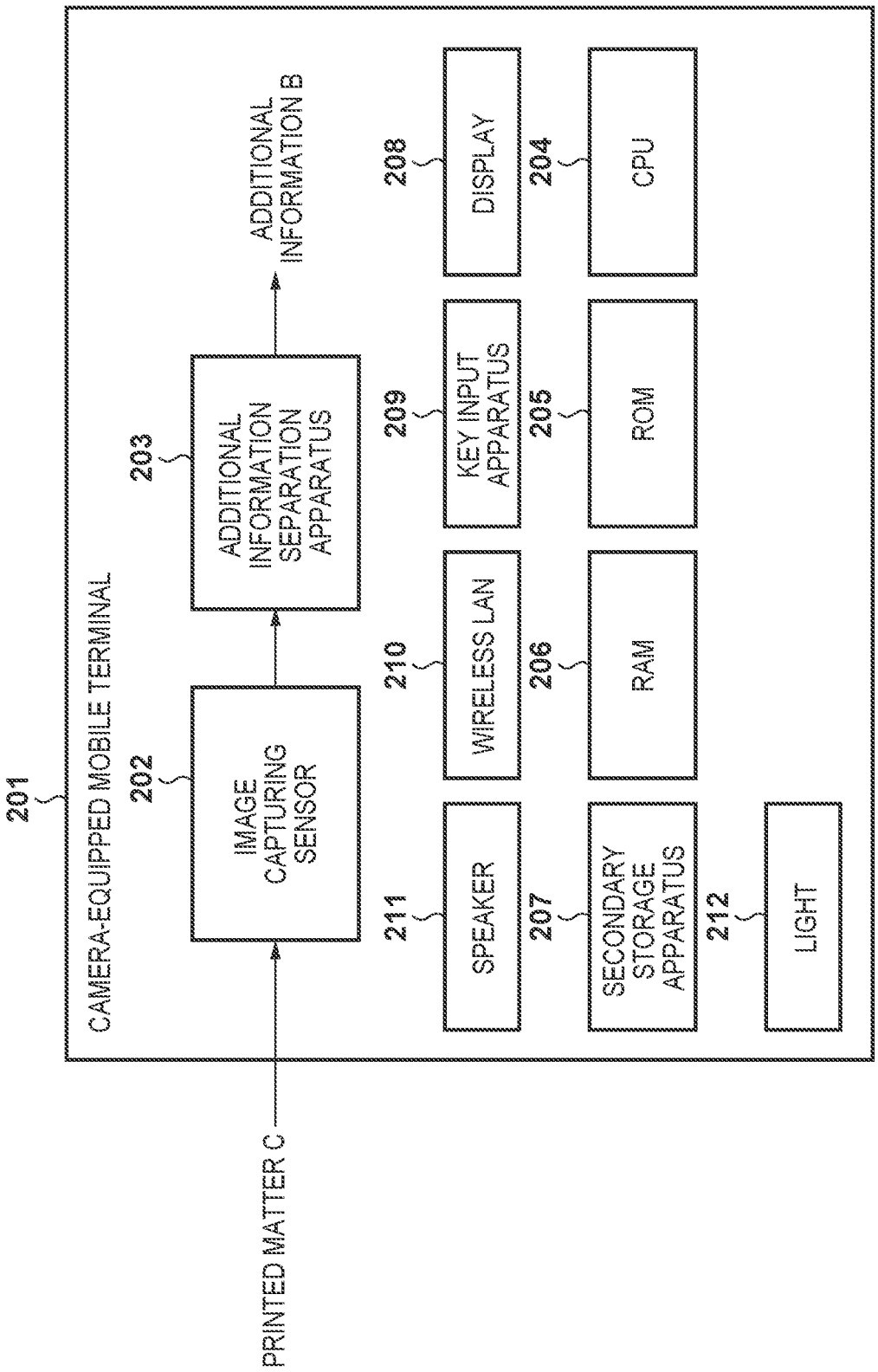
FIG. 2 is a diagram illustrating an example of a configuration of a multiplexing decoding processing unit.

FIG. 2 is a diagram for explaining an example of a configuration of hardware (a multiplexing decoding processing unit) for multiplexing decoding in which the additional information B is extracted from image information printed on the printed matter C in the information processing system. This hardware has an image capturing apparatus such as a camera to capture an image of the printed matter C on which multiplexing encoding processing has been performed, analyzes the captured image, and extracts the additional information B embedded in the image. Here, this series of processes are also referred to as "readout processing", "separation processing", and "extraction processing".

FIG. 2 is a diagram for explaining an example of a configuration of hardware (a multiplexing decoding processing unit) for multiplexing decoding in which additional information embedded in printed matter is extracted in the information processing system. Here, a camera-equipped mobile terminal is adopted as an example of the information processing system.

In FIG. 2, a camera-equipped mobile terminal (information processing apparatus) 201 that holds an image capturing sensor 202 has a function for capturing an image of the printed matter C. An additional information separation apparatus 203 extracts the additional information B, as will be described later, by analyzing an image captured by the image capturing sensor 202, which is a light receiving element unit. A CPU (also referred to as a central processing unit or processor) 204 executes an information processing method in accordance with a program. A ROM 205 stores a program that is executed by the CPU 204. A RAM 206 functions as a memory for temporarily storing various kinds of information during execution of a program by the CPU 204. A secondary storage apparatus 207, such as a hard disk, stores image files, databases including image analysis results, and the like. A display 208 presents to a user a result of processing by the CPU 204, for example. A key input apparatus 209 performs processing instructions, character input, and the like in accordance with touch panel operation using the display 208 having a touch panel function.

A wireless LAN (Local Area Network) connection unit 210 is connected to the Internet via a wireless LAN and displays on the display 208 a screen of a site or the like by accessing a site connected to the Internet. The wireless LAN connection unit 210 is also used for transmitting and receiving data, for example. A speaker 211 outputs audio when extracted additional information is audio data or video data with audio. Also, when there is video data at an Internet connection destination, audio is outputted when the video data is played back. Light 212 irradiates light onto the printed matter C at the time of image capturing of the printed matter C. An amount of light of light irradiation (or a luminous flux) can be adjusted by control such as by the CPU 204; for example, when using an LED as a light source, it is possible to perform light amount control by controlling an input voltage by pulse-width modulation or the like. Light amount control may be performed in a plurality of stages (e.g., two stages) or may be performed in a continuous manner.

The camera-equipped mobile terminal 201 is not limited to a configuration in which the image capturing sensor 202 is incorporated. For example, a configuration may be taken such that the image capturing sensor 202 is controlled by an apparatus separate from the mobile terminal 201 and a captured image is transmitted to the additional information separation apparatus 203. As the image capturing sensor 202, it is possible to use a digital camera, a video camera, or the like, and as the additional information separation apparatus 203, it is possible to use a personal computer, a smartphone, or the like; a configuration need only be such that the additional information B can be extracted from the printed matter C. In the following, processing for extracting the additional information B from the printed matter C is also referred to as "multiplexing decoding processing". Alternatively, it is simply decoding processing.

(1-2) Firmware Configuration for Multiplexing Encoding Processing

Figure 3:
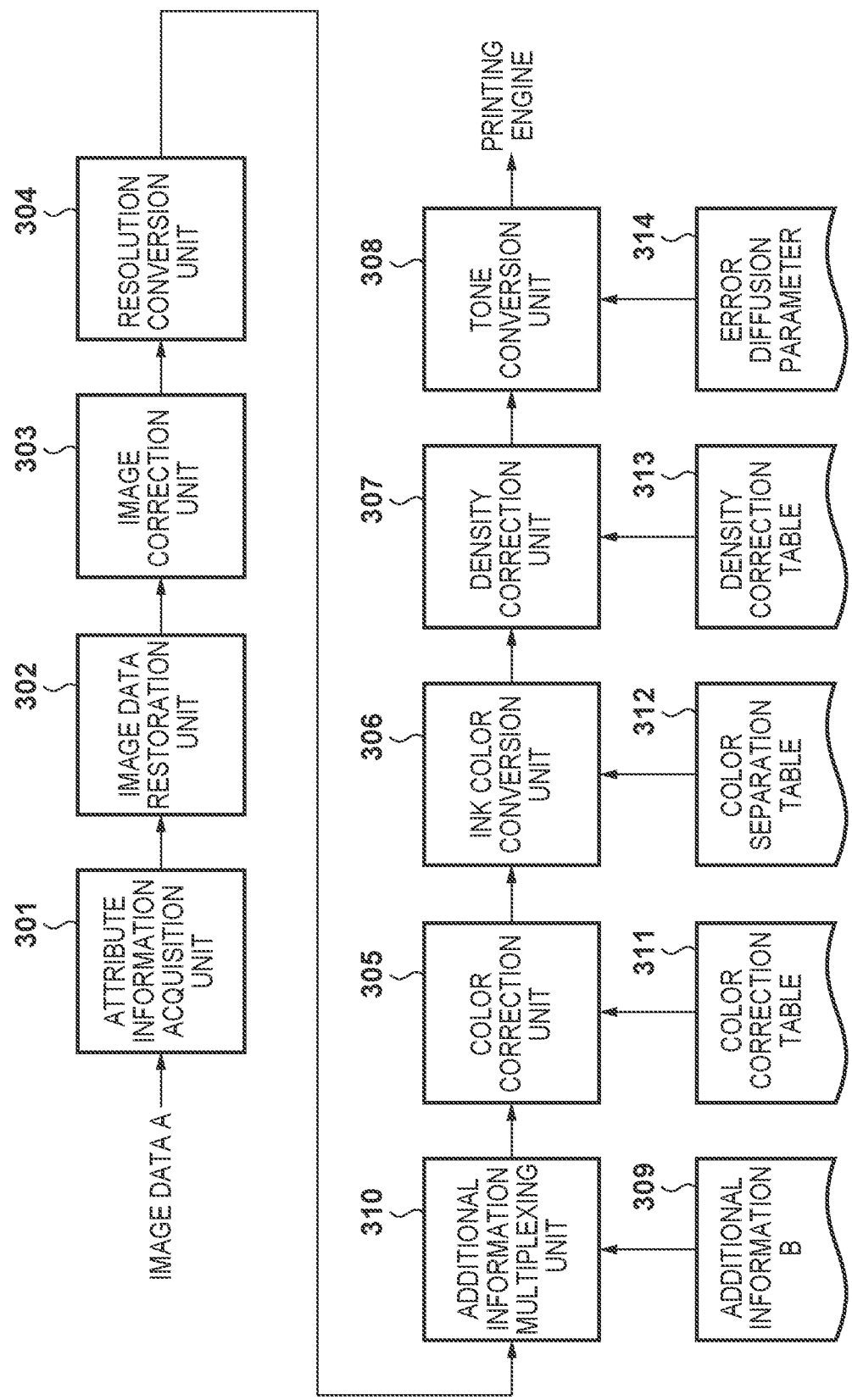
FIG. 3 is a block diagram for multiplexing encoding processing.

FIG. 3 is a block diagram of a basic firmware configuration for multiplexing encoding processing. Image data is subjected to the following processing and is transmitted to a printing engine connected to a print head after being converted to a resolution and the number of tones that can be received by the printing engine.

(1-2-1) Attribute Information Acquisition Unit

An attribute information acquisition unit 301 acquires various parameters used at the time of compressing image data. Various parameters may be stored in association with compressed image data and may be included, for example, in a compressed image data file or attached as attribute information or the like. The acquired various parameters are sent to an image data restoration unit 302 used for processing for extracting (restoring) image data from a compressed image. Further, the acquired various parameters are used for processing for calculating a degree of compression. For example, the image data A, which is an input image, is irreversible image data obtained by compressing document data into a JPEG format and is to be printed on a printing medium. Irreversible image data includes a quantization table and an image data size used at the time of compression. If compressed image data is a JPEG image, the acquiring unit 301 acquires an image data size and a quantization table. The acquired image data size information, a codebook, and a quantization table are sent to the image data restoration unit 302.

(1-2-2) Image Data Restoration Unit

The image data restoration unit 302 extracts image data by decoding encoded image data. In the following, a description will be given assuming that an input image is a JPEG image.

Figure 4:
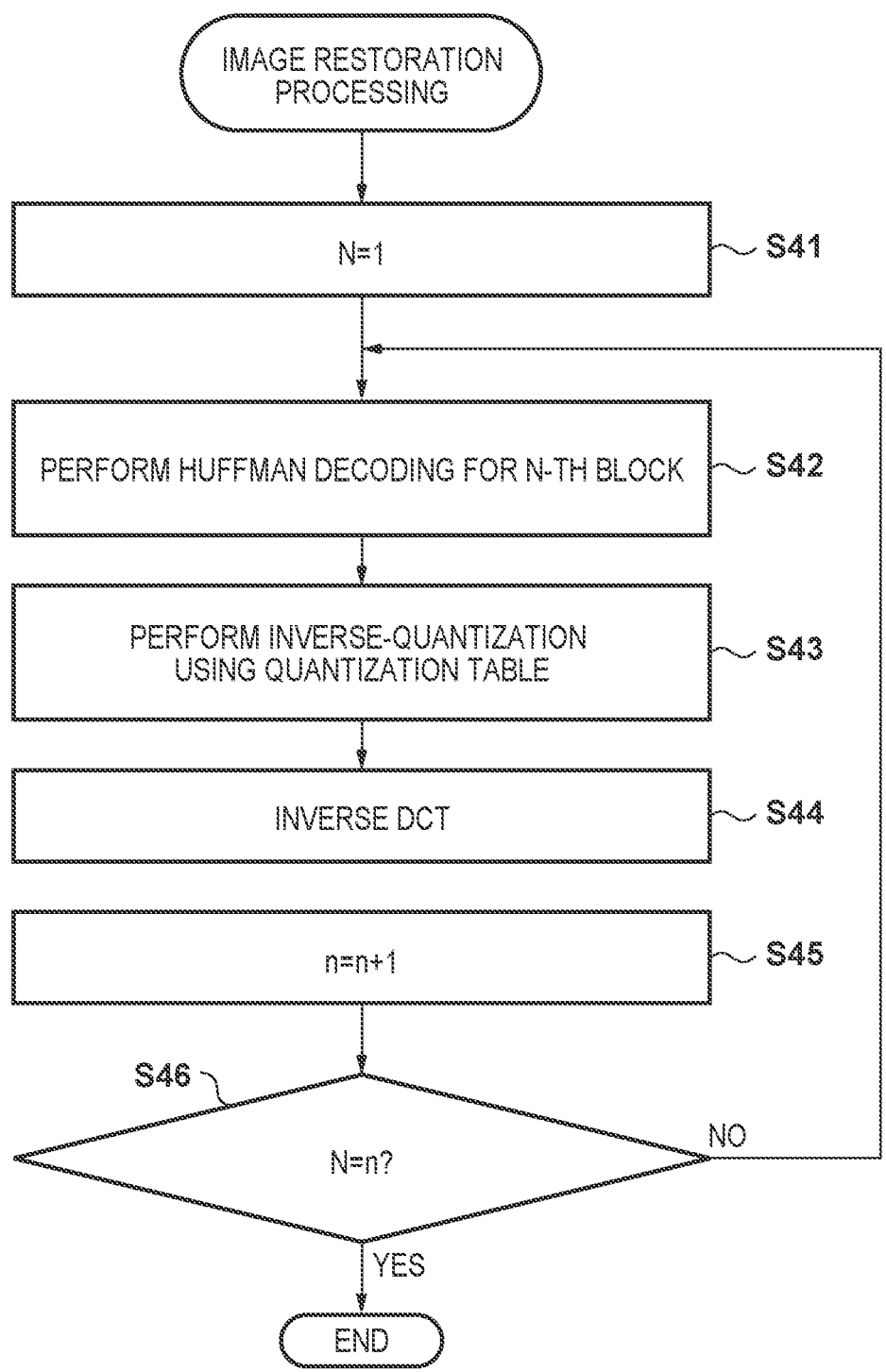
FIG. 4 is flowchart of a decoding process.

FIG. 4 is a flowchart for explaining processing in which the restoration unit 302 decodes encoded image data. For example, it is assumed that an image whose data format is JPEG, is divided into N eight-pixel square blocks (8×8 pixel blocks). First, Huffman decoding is performed for a first block in units of eight-pixel square blocks (step S41, step S42), inverse quantization is performed using an acquired quantization table (step S43), and then inverse discrete cosine transform (DCT) is performed (step S44). This is performed for all N blocks of a target screen (step S45, step S46). Since a known method is used for processing for decoding JPEG, in the following, details of Huffman coding, inverse quantization, and inverse DCT are omitted, and only an overview thereof will be described.

Huffman coding is a compression method for reducing the total number of bits by assigning a code with shorter number of bits to frequent data. In Huffman decoding, Huffman coding is defined in advance in a specification, and decoding to the original data is performed in accordance with that specification. For example, a codebook is defined as a specification and is used for Huffman coding and decoding. Inverse quantization processing for expanding image data by inverse quantization using a quantization table (a quantization table used at the time of compressing image data) acquired by the attribute information acquisition unit 301. Inverse DCT is processing for performing inverse conversion for restoring image data converted to a direct current component (DC component) and an alternating current component (AC component) by DCT to data of an original image density component. JPEG compression is often implemented in a format of luminance Y and chrominance Cb and Cr, and in such a case, data subjected to inverse DCT processing is in a YCbCr format. Values in a YCbCr format are converted to image signal values of color components red, green and blue (RGB) by the following Equation 1.

$$R = Y + 1.402 \times Cr$$

$$G = Y - 0.344 \times Cb - 0.714 \times Cr$$

$$B = Y + 1.772 \times Cb \qquad \text{EQUATION 1}$$

(1-2-3) Image Correction Unit

An image correction unit 303 performs image correction processing on RGB data decoded by the image data restoration unit 302. Image correction includes, in addition to brightness adjustment for brightening or darkening the overall color, contrast adjustment, and color balance adjustment, various corrections such as backlight correction and red-eye correction where photography printing is assumed. By processing these corrections in a centralized fashion in the image correction unit 303, processing independent of a printing apparatus can be realized.

(1-2-4) Resolution Conversion Unit

A resolution conversion unit 304 converts image data to a resolution corresponding to a printing apparatus. Based on a scaling amount derived in accordance with input image data and a resolution of the printing apparatus, processing of enlargement or reduction is performed. As scaling processing, there are nearest neighbor, bilinear, and bicubic methods and the like, and a method may be appropriately selected in consideration of processing characteristics and processing speed. In an example of FIG. 5, additional information is multiplexed after resolution conversion processing, and color correction is performed on image data in which additional information is multiplexed. However, here, color correction will be first described, and additional information 309 and an additional information multiplexing unit 310 will be described after a tone conversion unit 308.

(1-2-5) Color Correction Unit

A color correction unit 305 performs conversion processing on image data so that an image printed by a printing apparatus will be of a suitable color. For example, when printing an image displayed on a display apparatus, color reproduction ranges of the display apparatus and the printing apparatus do not necessarily match. With some colors, the reproduction range of the printing apparatus is narrower, and with other colors, the reproduction range of the printing apparatus is wider. Therefore, color is compressed and decompressed as appropriate while keeping image degradation to a minimum.

In this example, these processes are implemented in an RGB format. That is, an RGB value inputted to the color correction unit 305 is converted into an RGB value for a printing apparatus (hereinafter, also referred to as "RGB for a printing apparatus") in consideration of reproducibility of the printing apparatus. This conversion can also be performed by computation such as a matrix. Generally, a three-dimensional color correction table 311 is used. When an RGB value to be inputted is set to 8 bits (256 tones) for each color, it is not realistic from the viewpoint of storage capacity to hold all combinations, and therefore, a table that is thinned out at predetermined intervals is used as the color correction table 311.

Figure 6A:
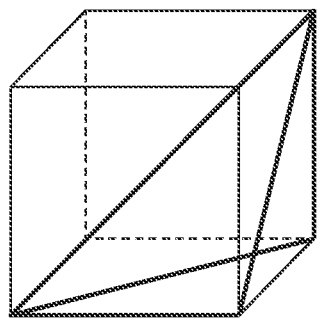
FIGS. 6A, FIG. 6B, FIG. 6C, FIG. 6D, FIG. 6E, FIG. 6F, and FIG. 6G are diagrams for explaining a tetrahedral interpolation method.
Figure 6B:
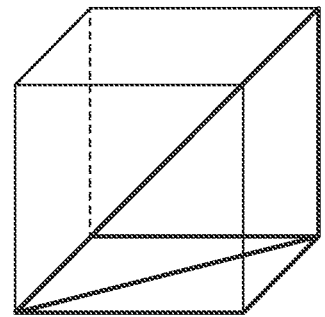
Figure 6C:
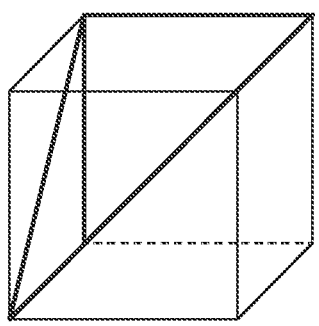
Figure 6D:
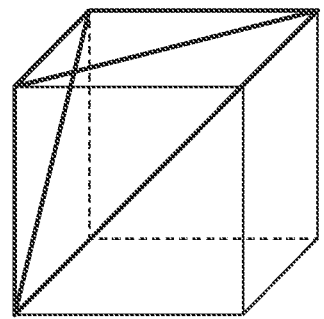
Figure 6E:
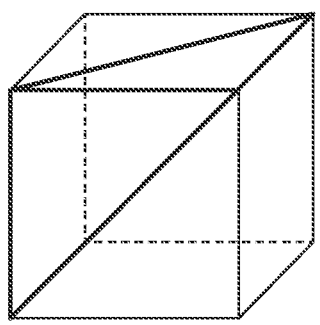
Figure 6F:
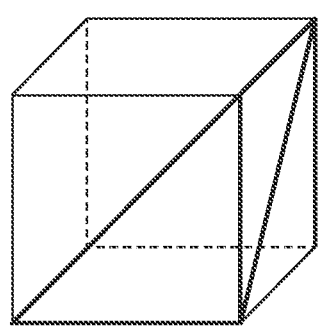
Figure 6G:
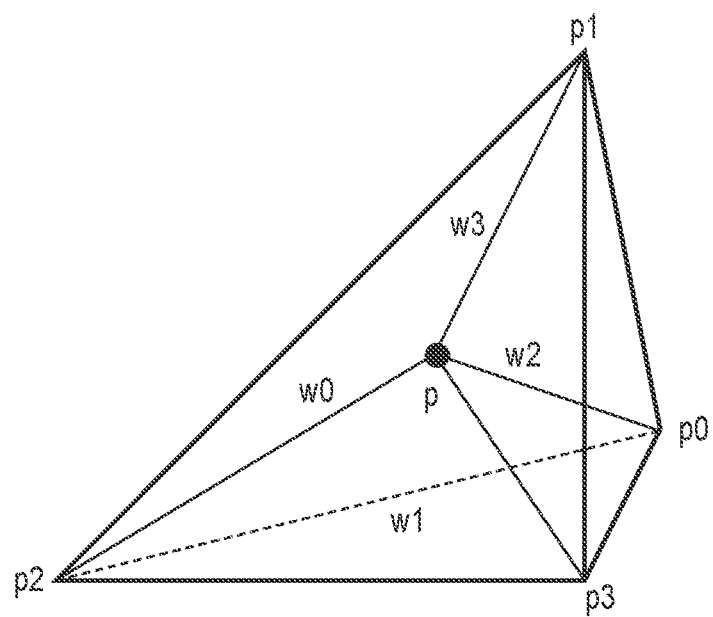

FIG. 5 is a diagram for explaining an example of the color correction table 311. The color correction table 311 of this example is a table in which each color, 256 tones, is set as 17 grid points and a corresponding RGB value for a printing apparatus is described (17*17*17=4913 grid points). A value between grid points is calculated using interpolation processing. An interpolation method can be selected from several methods, and in this example, a tetrahedral interpolation method is used. The tetrahedral interpolation method is a linear interpolation using four grid points with units of division of a three-dimensional space as tetrahedrons. In the tetrahedral interpolation method, first, a three-dimensional space is divided into tetrahedrons having grid points as four vertices as illustrated in FIG. 6A to FIG. 6F, and then, it is determined whether a target point p belongs to any of divided tetrahedrons. The four vertices of that tetrahedron are p0, p1, p2, and p3, respectively, and as illustrated in FIG. 6G, the point p is made to be one of the vertices, and the tetrahedron is further divided into four smaller tetrahedrons with each surface of the original tetrahedron as a bottom surface. When a converted value of each point given by the color correction table are f(p0), f(p1), f(p2), and f(p3), respectively, an interpolation value f(p) can be obtained by the following Equation 2.

$$f(p) = \sum_{i=0}^{3}(wi * f(pi)) = \\ w0 \cdot f(p0) + w1 \cdot f(p1) + w2 \cdot f(p2) + w3 \cdot f(p3)$$ EQUATION 2

Here, w0, w1, w2, and w3 are each a ratio of a volume of a smaller tetrahedron (i.e., a smaller tetrahedron whose vertices are not the points pi) at a position opposite to each vertex pi. Thus, an RGB value for a printing apparatus corresponding to a target RGB value is calculated. In this case, an output may be 8 bits or more in consideration of tone. Further, since the color correction table also depends on a color reproduction range of a printing apparatus, when different printing sheets (printing media) are used for printing, for example, in one embodiment, a table corresponding thereto is to be prepared.

(1-2-6) Ink Color Conversion Unit

An ink color conversion unit 306 converts an RGB value for a printing apparatus converted by the color correction unit 305 into an ink color value. For this conversion, a color separation table 312 in which a combination of an RGB value for a printing apparatus and an ink color value are associated in advance is used. Similarly to the color correction unit 305, a table of 17 grid points is also used in the ink color conversion unit 306.

FIG. 7 is a diagram for explaining an example of the color separation table 312. In the color separation table 312 of this example, four colors of cyan (C), magenta (M), yellow (Y), and black (K) are assumed as ink colors, and values of four colors corresponding to each grid point are described. These values are determined in consideration of ink not overflowing on a printing surface of a printing sheet (printing medium), inks not seeping out when adjacent to each other, and the like. Therefore, when different printing sheets (printing media) are used for printing, in one embodiment, the color separation table 312 corresponding thereto is to be prepared. In addition, similarly to the color correction unit 305 described above, a value of an ink color corresponding to an RGB value for a printing apparatus can be interpolated by tetrahedral interpolation processing.

(1-2-7) Density Correction Unit 307

In an inkjet printing apparatus, dots are formed on a printing sheet (printing medium), and as an amount of applied ink increases, an overlap of dots increases, and it becomes more difficult to increase a printing density of an image. In order to make such a responsiveness of a density uniform, a density correction unit 307 corrects density. By such density correction, it becomes easy to guarantee accuracy in creation of the color correction table 311 and the color separation table 312. In a printing apparatus that uses cyan (C), magenta (M), yellow (Y), and black (K) ink, density correction is performed for those ink colors. In this example, a one-dimensional density correction table 313 is used. As the table, a table corresponding to 8 bits (256 tones) of input for each ink color need only be provided, and it is possible to use a table in which an input signal value and a corrected output signal value are associated without particularly thinning out.

(1-2-8) Tone Conversion Unit 308

A tone conversion unit 308 converts multi-bit data, which has been converted for each ink color and subjected to density correction, into the number of tones that can be printed in a printing apparatus. In this example, conversion into two tones (1 bit) of print "1"/not print "0" is executed, and as a tone conversion method, an error diffusion method that can reproduce visually suitable tones by eliminating a low-frequency component of an image is used. Also, 8-bit data of 0 to 255 is assumed as an input signal.

FIG. 8 is a diagram for explaining an error distribution method in an error diffusion method. A signal value L of a target pixel is compared with a threshold TH. In this example, the threshold is set at 127 in order to binarize 0 to 255, and it is determined whether a target pixel is "1" (print) or "0" (not print), as indicated below.

$L > TH$ ... 1(print)

$L \leq TH$ ... 0(not print)

A quantization representative value V is set as follows in accordance with a result of this determination.

1(print) . . . 255

0(not print) . . . 0

An error E (=L−V) generated by setting the quantization representative value V in this way is distributed to surrounding pixels in accordance with a distribution coefficient of FIG. 8.

A value La obtained by adding a distributed error Ea to the signal value L of the next target pixel is compared with the threshold to determine whether the target pixel is "1" (print) or "0" (not print) as follows.

$La > TH$ . . . 1(print)

$La \leq TH$ . . . 0(not print)

By executing such processing for all pixels and all ink colors C, M, Y, and K, printable 1-bit print data for each ink color is obtained.

(1-2-9) Additional Information

The additional information 309 is the additional information B embedded in the image data A in the multiplexing apparatus 102 of FIG. 1A or the multiplexing unit 105 of FIG. 1B, and is, for example, text document data (text data). The text document data is, for example, numerical data in which numbers and characters are assigned a numeric value using a known character code, and the numerical data is transmitted as the additional information 309 to the multiplexing unit 310.

As a specific example, text document data corresponding to the characters "hello" will be described. It is assumed that the text document data is numerical data or so-called binary data. Binary data is information of "0" or "1", and a continuous connection of the information of "0" or "1" has a specific meaning. A correspondence between binary data and characters is defined by a character code. In the case of "Shift-JIS code" which is one of the character codes defined in Japanese Industrial Standard (JIS), "h" corresponds to "01101000" of binary data. Similarly, "e" corresponds to binary data "01100101", "l" to "01101100", and "o" to "01101111". Thus, the characters "hello" can be represented as "0110100001100101011011000110110001101111" in binary data. Conversely, if binary data "0110100001100101011011000110110001101111" can be acquired, the characters "hello" can be acquired. The additional information 309 corresponds to numerical data converted into such binary data.

(1-2-10) Additional Information Multiplexing Unit

The additional information multiplexing unit 310 receives image data converted by the resolution conversion unit 304 and the additional information 309 and embeds the additional information 309 into the image data. In this embedding processing (multiplexing processing), the additional information 309 is embedded into the image data so that the additional information 309 can be read from a printed image of the image data into which the additional information 309 (such as a text document converted into binary data of "0" and "1") has been embedded. For example, information of "0" and "1" corresponding to binary data is embedded by performing masking processing on image data such that that binary data of "0" and "1" of the additional information 309 can be read. In this example, by performing mask processing on image data, image data of a predetermined region is made to have a different periodicity corresponding to binary data of "0" and "1".

Figure 9A:
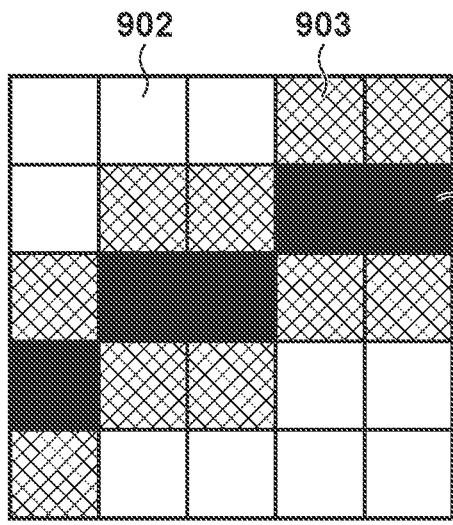
FIGS. 9A and FIG. 9B are explanatory diagrams for mask data.
Figure 9B:
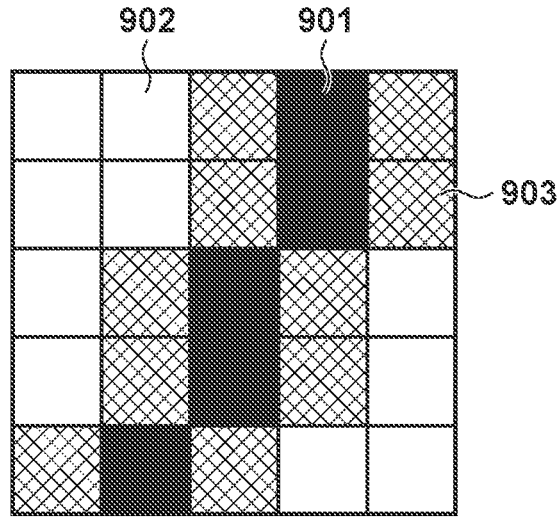

FIG. 9A and FIG. 9B are diagrams for explaining mask data corresponding to binary data of "0" and "1", respectively. These mask data are of a size corresponding to a region of 5 pixels (hereinafter, to be abbreviated as px)×5 px. By combining a pattern of FIG. 9A or FIG. 9B having a different periodicity into an image, the respective mask data embeds the binary data of "0" or "1" into image data corresponding to a region of 5 px×5 px. When reading a printed image, the binary data of "0" or "1" can be read by recognizing a periodicity corresponding to the binary data of "0" or "1" by analyzing a frequency of the read data, for example.

In the additional information multiplexing unit 310, the additional information 309 is embedded by causing image data to have a periodicity corresponding to binary data of "0" and "1" based on binary data (numerical data) of the additional information 309. As an example of a method of embedding the additional information 309 into image data, a method in which it is assumed that image data is single-color gray image data and binary data of "0" and "1" is embedded into the entire image data will be described.

Assume that a size of an image to be multiplexed is 640 px in height and 480 px in width, and mask data is a size of 5 px×5 px in the same manner as in FIG. 9A and FIG. 9B. Assume that binary data of "0" is represented by mask data of FIG. 9A, and binary data of "1" is represented by FIG. 9B. In the mask data of FIG. 9A and FIG. 9B, a 5×5 pixel block is divided into black blocks 901, a white blocks 902, and a hatched blocks 903. The black block 901 corresponds to a numeric value "+2", the white block 902 corresponds to a numeric value "0", and hatched block 903 corresponds to a numeric value 1". In a pseudocode below, when a Boolean variable ismaskA is true, mask data stored in maskA is superimposed on an image. At this time, the mask data of FIG. 9A is used as maskA if additional information is "0", and the mask data of FIG. 9B is used as maskA if additional information is "1". A pseudocode for applying numeric values corresponding to black, white, and hatched blocks of FIG. 9A and FIG. 9B to the entire image data is indicated below. A bit length of additional information is set as codelen, and the additional information is set as embedinfo.

Pseudocode:

```
1    int i, j, k, l;
2    int width = 640, height=480, codelen=additional information length, m=0;
3    unsigned char *data = image data;
4    int **maskA = mask data;
5    bool *embedinfo = additional information;
6    bool isMaskA = true;
7    for(j = 0; j < height; j+=5){
8      for(i = 0; i < width; i+=5){
9        if(embedinfo[m] == true){
10         maskA = a pattern corresponding to "1";
11       }
12       else{
13         maskA = a pattern corresponding to "0";
11       }
```

```
12      m = (m+1) mod codelen;
13      for(k = 0; k < 5; k++){
14        for(l = 0; l < 5; l++){
15          if(isMaskA == true){
16            data[(i+k)+(j+l)*width] += maskA[k][l];
17          }
18        }
19      }
20    }
21  }.
```

As indicated in the above pseudocode, patterns of FIG. 9A and FIG. 9B are formed in accordance with values of additional information by dividing the entire image into 5 px×5 px blocks and adding maskA data for each block. Here, maskA is array data of either FIG. 9A or FIG. 9B, and if a value of the additional information is 0, a pattern of FIG. 9A may be selected, and the value is 1, a pattern of FIG. 9B may be selected. ismaskA may be one bit of bitmap information that is true for a region of a target image in which additional information is multiplexed and is false otherwise. In the above pseudocode, ismaskA is true, and the entire image is made to be a multiplexing target. Further, in the above code, an example in which a pattern corresponding to the additional information is repeated multiplex has been described; however, a plurality of corresponding patterns for one bit of additional information may be embedded two-dimensionally in succession (e.g., over m×n blocks), for example.

As a pattern corresponding to binary data (numerical data) of the additional information 309, there are cases where it is desired to form a pattern that is as visually inconspicuous for a human as possible. As in this example, when image data is single color gray image data, a pattern must be formed by a luminance component, so it becomes visually conspicuous. Although it depends on the shape and the frequency component of a pattern, there is a tendency that a change in a color component is less visually conspicuous than a change in a luminance component. For example, a color image having an RGB component is converted into a color space such as YCbCr, Lab, or Yuv, and divided into a luminance component and a color component. Then, by applying mask data to the color component rather than the luminance component, it is possible to form a pattern that is visually less conspicuous. For example, if a Y (yellow) component is multiplexed with additional information, it is visually less conspicuous. Further, for example, in a color image having an RGB component, when a red color is dominant in a 5 px×5 px region on which a pattern is to be added. In one embodiment, the pattern to be added uses a red component.

In this example, mask data is added to image data in 5 px×5 px block units. However, block size units and the shape of a mask are arbitrary and addition, subtraction, multiplication, division, and the like may be combined as a method for embedding mask data into image data. Any method may be used as long as a pattern of mask data can be distinguished when printed matter of an image into which the additional information 309 is embedded is captured. Accordingly, the additional information multiplexing unit 310 is a processing unit for embedding the additional information 309 into image data so that the additional information 309 can be extracted when printed matter of an image in which the additional information 309 is embedded is captured.

(1-3) Multiplexing Encoding Processing

Figure 10:
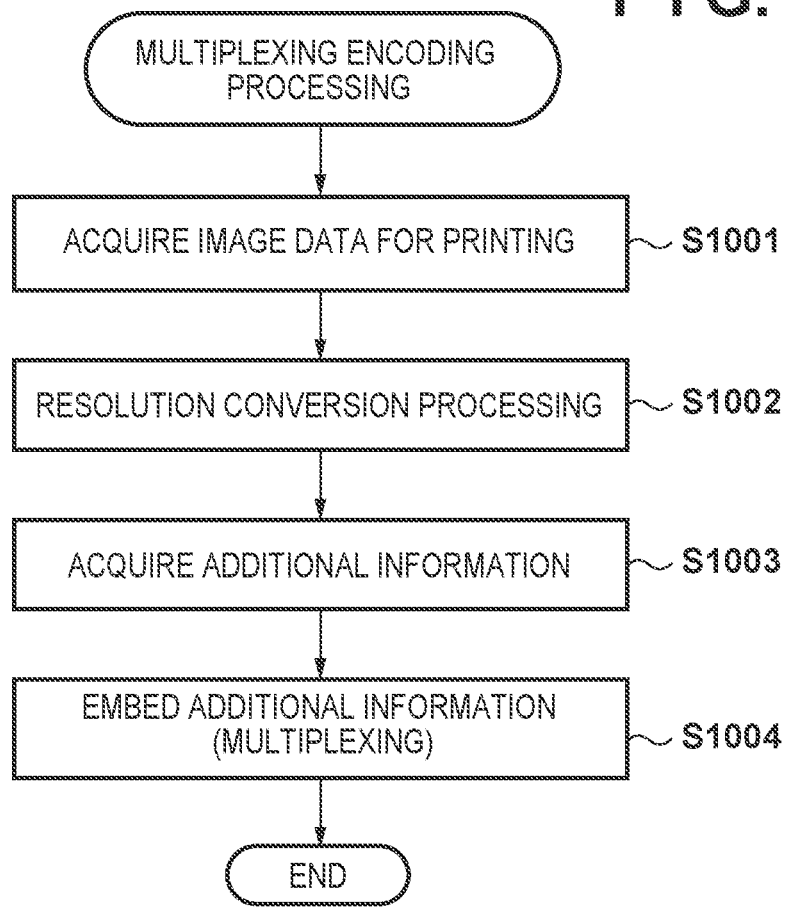
FIG. 10 is a flowchart of multiplexing encoding processing.

FIG. 10 is a flowchart for explaining multiplexing encoding processing in this example. First, the image data A for printing is acquired by the attribute information acquisition unit 301 and the image data restoration unit 302 of FIG. 3 (step S1001). For example, the image data A is data that is captured in advance by a camera-equipped mobile terminal (smartphone) and stored in a JPEG format in a memory in the mobile terminal. The acquired JPEG image data is decompressed, and 3-color and 8-bit RGB image data of a still image is generated. Further, if necessary, the image correction unit 303 of FIG. 3 performs correction or processing on the acquired image data.

Next, based on an arbitrarily selected sheet size (the size of a printing medium) and the resolution of a printing apparatus, resolution conversion processing is performed on the acquired image data A (step S1002). For example, when the selected sheet size is 2L, the resolution of the image data A is converted in accordance with the number of pixels of an input resolution in a printing apparatus. Specifically, when the input resolution in the printing apparatus is set to 600 dpi (dots per inch), the number of pixels of the sheet size 2L is set to 3000 pixels×4000 pixels. In this case, for the image data A whose number of pixels is 1500 pixels×2000 pixels, resolution conversion is performed so that the number of pixels in the vertical and horizontal directions is twofold, respectively. If it is desired to not change the aspect ratio of an input image, the resolution conversion is performed with the same enlargement and reduction rates in vertical and horizontal directions.

Next, the additional information multiplexing unit 310 acquires the additional information 309 to be embedded in the image data A (step S1003). For example, text document data inputted by key input on a smartphone is acquired. The text document data is, for example, made using a well-known character code Shift-JIS into numerical data in which numerals and characters are assigned numeric values. The numerical data is transmitted as the additional information 309 to the multiplexing unit 310.

Next, additional information multiplexing processing for embedding the additional information 309 in the image data A is performed by the additional information multiplexing unit 310 in FIG. 3 (step S1004). FIG. 11 is a block diagram for explaining a firmware configuration of the multiplexing unit 310 in this example. In the following, a description will be given for each processing unit in the multiplexing unit 310.

(1-3-1) Color Space Conversion Unit

A color space conversion unit 1101 is a processing unit that converts a color space of image data whose size is changed in the resolution conversion unit 304 into a color space for information multiplexing. For example, as shown in Equation 3 below, the color space component for performing information multiplexing is made to be in the U in the YUV color space, and so the image data is converted from the RGB color space into the YUV color space.

$$Y = 0.299 \times R + 0.587 \times G + 0.114 \times B$$

$$U = -0.169 \times R - 0.331 \times G + 0.500 \times B$$

$$V = 0.500 \times R - 0.419 \times G - 0.081 \times B \qquad \text{EQUATION 3:}$$

(1-3-2) Block Position Setting Unit

In the present example, the additional information 309 is embedded by dividing the image data into a plurality of block regions, modulating the density of each pixel in block units, and forming a pattern corresponding to the mask data of FIG. 9A and FIG. 9B. A block position setting unit 1102 acquires the image data after color space conversion and sets, for an image of a specified color plane, position coordinates of a block in accordance with the size of a specified one block. For example, the size of an image of a U color plane of YUV is assumed to be 640 px in height and 480 px in width, and the block size is assumed to be 5 px in height and 5 px in width. In this case, the number of blocks in a vertical direction is 128 (=640÷5), the number of blocks in a horizontal direction is 96 (=480÷5), and the total number of blocks is 12288 (=128×96). For example, setting can be performed by defining the upper left coordinate of each block as a block position.

(1-3-3) Digitization Unit

A digitization unit 1103 converts the received additional information 309 into digitized data. For example, the additional information 309 is made into a Shift-JIS character string. In this case, a conversion map in which characters and numeric values are associated in accordance with a Shift-JIS is stored in advance, and the character string is converted into a numeric string using the conversion map. For example, in a case of a character string "hello", a numeric string after conversion is "0110100001100101011011000110110001101111".

(1-3-4) Pattern Selection Unit

In a pattern selection unit 1104, mask patterns for performing density modulation of each pixel in block units are registered, and the pattern selection unit 1104 selects a mask pattern to be applied for the additional information 309 quantified by the digitization unit 1103.

Figures 12A, 12B, 13:
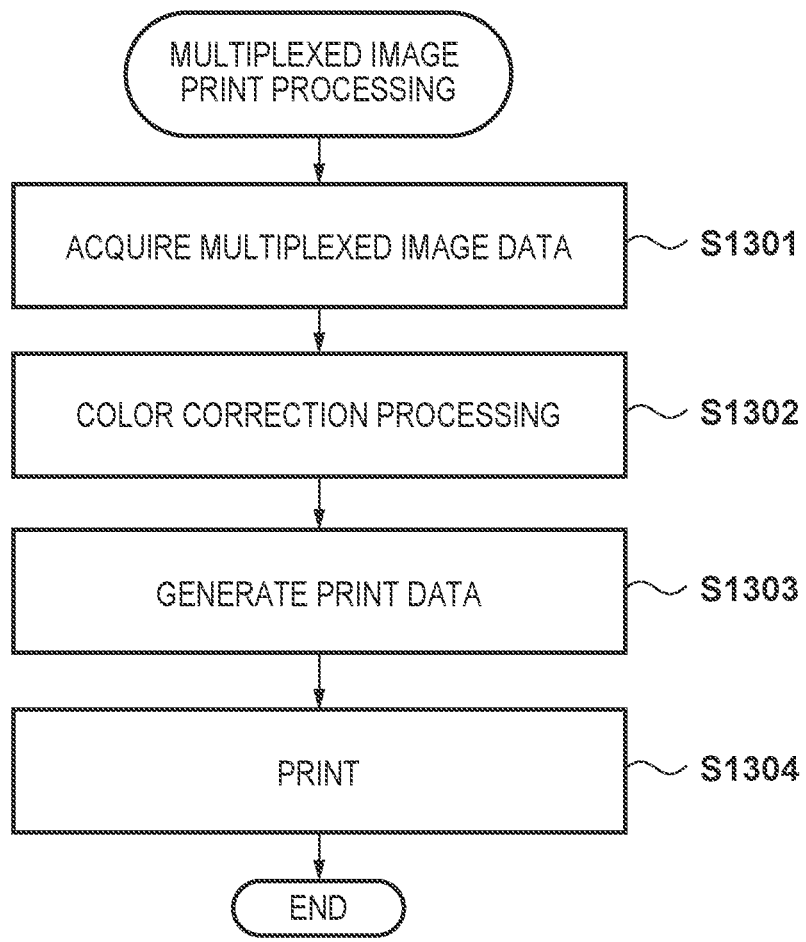
FIGS. 12A and FIG. 12B are diagrams illustrating examples of quantification of patterns of mask data.
FIG. 13 is a flowchart of processing for printing image data after multiplexing encoding processing.

FIG. 12A and FIG. 12B are diagrams in which the pattern of FIG. 9A and FIG. 9B differing in frequency characteristics are digitized. As described above, the pattern of FIG. 9A and FIG. 12A corresponds to "0" of the binary data of the additional information 309, and the pattern of FIG. 9B and FIG. 12B corresponds to "1" of the binary data of the additional information 309.

(1-3-5) Information Multiplexing Unit

An information multiplexing unit 1105 acquires image data on which color space conversion has been performed in the color space conversion unit 1101, the position of each block set in the block position setting unit 1102, and a mask pattern selected in the pattern selection unit 1104. From this acquired information, the information multiplexing unit 1105 generates image data obtained by applying a mask pattern to the image data. The application of a pattern may be, for example, a pixel-by-pixel addition. Addition may be the addition of a mask pattern itself or may be weighted addition.

As described above, when the image size is 640 px in height and 480 px in width, and the size of one block is 5 px in height and 5 px in width, the total number of blocks is 12288. When capturing a printed image of the printed matter C, it is not always possible to capture the entire image. Therefore, the same additional information is embedded in a plurality of locations in the printed image so that the additional information can be extracted only by capturing a portion of the printed image of the printed matter C. For example, when 96 blocks are one piece of additional information, the same additional information is embedded in 128 (=12288÷96) regions for the total number of blocks 12288. Therefore, the image data is divided into 128 regions, and in one region among them, 96 blocks of additional information, each block having a vertical width of 5 px and a horizontal width of 5 px, is embedded. By handling 96 blocks as one piece of additional information, 96 bits of additional information can be set. However, in order to know the start position of 96 bits, 8 bits of "11111111" which are not represented as characters in Shift-JIS are included at the beginning of the additional information. The block immediately after "11111111" is detected corresponds to the first bit of substantial multiplexed additional information. Therefore, 88 (=96-8) bits of data becomes additional information.

The data to be contained in 96 bits is a numeric string of "0" and "1" of the additional information digitized in the digitization unit 1103, and a numeric value is defined for each 5 px×5 px block, and a mask pattern corresponding to the numeric value is selected. A mask pattern corresponding to the additional information is embedded in a 5 px×5 px block in image data. For example, image data is set to be a U color plane of YUV and processed for each block (5 px×5 px), and a value of a mask pattern of FIG. 12A or 12B is applied to a value of a U color plane of YUV. For example, addition/subtraction processing is performed, as in the following, on a value of a U color plane (a U value) of YUV in accordance with a numeric value of a mask pattern. In the equation, a reference value is a weight by which a value of a mask pattern is multiplied.

$$U \text{ value after application} = U \text{ value of } YUV + \text{reference value} \times \text{numeric value of mask pattern} \qquad \text{EQUATION 4}$$

For example, when a U value of one pixel in one block is "20", the reference value is "10", and a numeric value of a mask pattern to be applied is "0", the U value is processed as in the following Equation 5.

$$U \text{ value after application} = 20 + 10 \times 0 = 20 \qquad \text{EQUATION 5}$$

Also, when a U value of one pixel in one block is "30", and a numeric value of a mask pattern to be applied is "2", the U value is processed as in the following Equation 6.

$$U \text{ value after application} = 30 + 10 \times 2 = 50 \qquad \text{EQUATION 6}$$

In this way, in this example, multiplexing is realized by adding to each pixel a value obtained by multiplying a numeric value of a mask pattern to be applied and a reference value. The method of applying a mask pattern is not limited to the method of the present example as long as a mask pattern can be embedded on a U color plane; for example, a U value of YUV may be multiplied by a numeric value of a mask pattern. Also, the size of a block is not limited to 5 pixels×5 pixels and may be larger or smaller. It need not be a square block and may be any shape so long as it that can be arranged continuously. However, the higher the spatial frequency, a pattern to be multiplexed is less visually conspicuous and more mask patterns can be multiplexed; therefore, approximately 5 pixels×5 pixels is applied in one embodiment.

Such multiplexing encoding processing is performed by the additional information multiplexing apparatus 102 of FIG. 1A or the additional information multiplexing unit 105 of FIG. 1B. The multiplexing encoding processing need not be included in the printer 103 or may be included in the printer 103. The image data after multiplexing encoding processing generated in the multiplexing apparatus 102 or the multiplexing unit 105 is transmitted to the printer 103 or the printing unit 106.

(1-4) Image Data Print Processing

FIG. 13 is a flowchart for explaining processing for printing image data after multiplexing encoding processing.

First, image data in which additional information is embedded in the additional information multiplexing unit 310 in FIG. 3 (multiplexed image data) is acquired (step S1301). Next, color correction is appropriately performed on the multiplexed image data by the color correction unit 305 of FIG. 3 (step S1302). Next, in the ink color conversion unit 306, the density correction unit 307, and the tone conversion unit 308 of FIG. 3, print data is generated by converting the image data after color correction to an ink color value, correcting density, and converting the image data after density correction to number of tones (step S1303). The print data is transmitted to the printing engine of FIG. 3 (e.g., the printer 103 of FIG. 1A), and the printing engine generates the printed matter C by applying ink of respective colors to a printing medium based on the print data.

(1-5) Basic Firmware for Multiplexing Decoding Processing

Figure 14A:
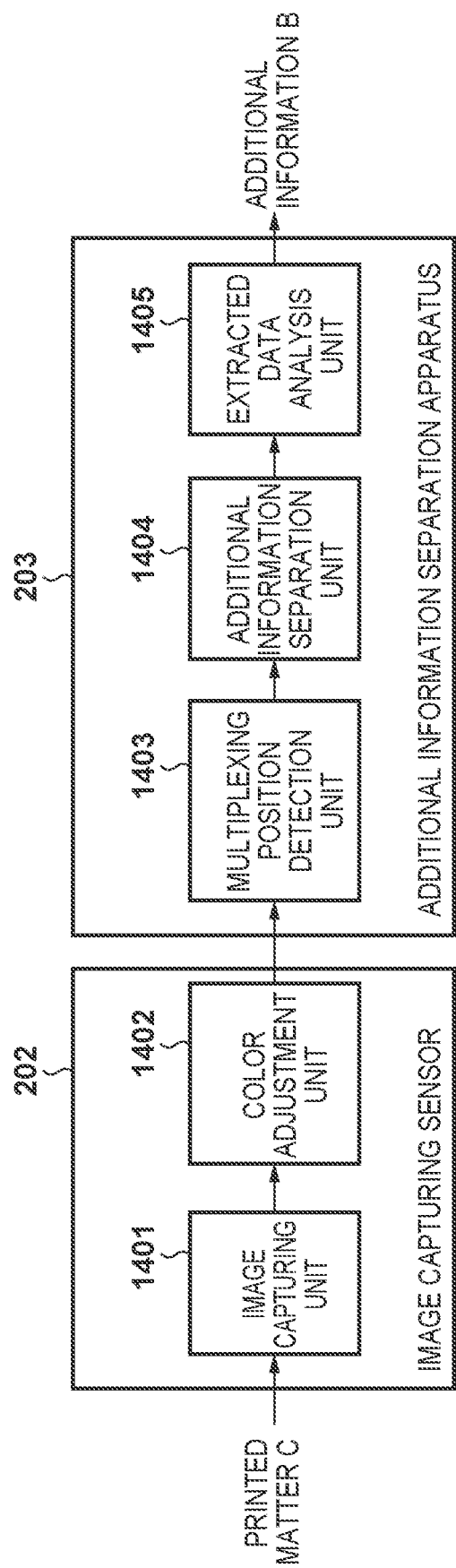
FIG. 14A is a block diagram of multiplexing decoding processing.

Next, a configuration and a procedure for multiplexed information extraction for extracting additional information by decoding an image in which additional information is multiplexed in accordance with the above description will be described. FIG. 14A is a diagram for explaining a configuration of basic firmware for multiplexing decoding processing according to the present example and extracts additional information embedded in a printed image of the printed matter C.

The image capturing sensor 202 (see FIG. 2) in this example includes an image capturing unit 1401 and a color adjustment unit 1402. Further, the additional information separation apparatus 203 (see FIG. 2) in this example includes a multiplexing position detection unit 1403, an additional information separation unit 1404, and an extracted data analysis unit 1405. Further, in the present example, digitized additional information data such as text document data, audio data, and video data is embedded in a printed image of the printed matter C. Regarding additional information, in the following description, it is assumed that, in the entire printed image of the printed matter C, different additional information is repeatedly embedded for each predetermined region.

(1-5-1) Image Capturing Unit

The image capturing unit 1401 captures and converts into image data a printed image of the printed matter C by an image capturing element in the image capturing sensor 202. An image formed on the image capturing sensor 202 by an optical system such as a lens is read by the image capturing unit 1401.

Figure 14B:
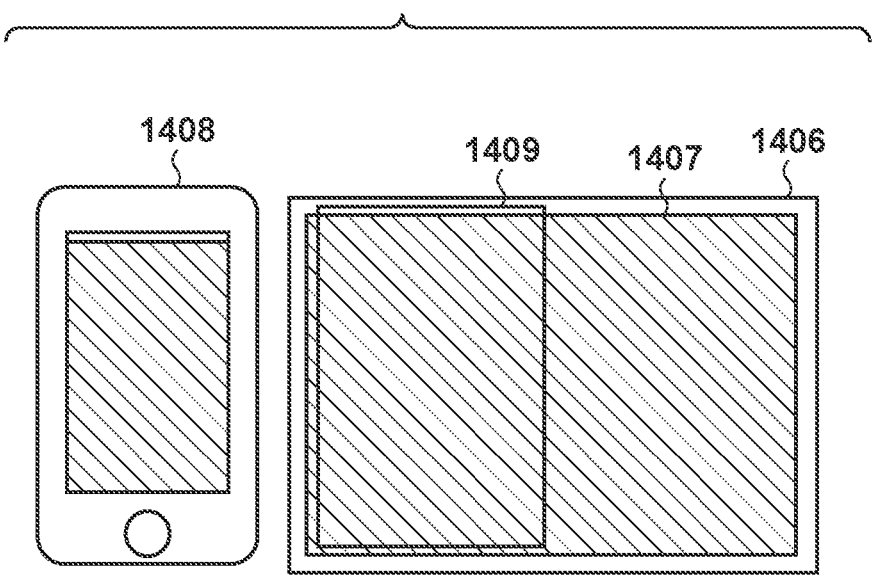
FIG. 14B is a diagram for explaining a case of capturing a printing image.

FIG. 14B is a diagram for explaining a case where a printed image of the printed matter C is captured by the camera-equipped mobile terminal 201. An image on which multiplexing encoding processing has been performed is printed in a printing region 1407 of a printing medium 1406 corresponding to the printed matter C. A region 1409 is a region captured by an apparatus 1408 corresponding to the camera-equipped mobile terminal 201 of FIG. 2. The image capturing unit 1401 incorporated in the apparatus 1408 captures an image of the region 1409 in the printing region 1407 of the printing medium 1406. It is possible to use a CCD or CMOS as an image capturing element in the image capturing unit 1401. CCDs and CMOSs sense light by a photodiode (a light receiving element) and change the light to a voltage. At that time, the light can be converted into color data by a color filter such as RGB or CMY arranged for each image capturing element. Further, an image capturing element has a range of reproducible brightness of light, and this is called a dynamic range. The dynamic range is defined as a ratio of the minimum luminance to the maximum luminance for which tones can be identified. A detection signal of a photodiode is sent to the color adjustment unit 1402.

(1-5-2) Color Adjustment Unit

The color adjustment unit 1402 converts output data of a photodiode in the image capturing unit 1401 into image data in which one pixel is RGB 8-bit data. Before conversion to image data is performed, interpolation processing for color such as RGB is performed on the output data of a photodiode in accordance with a light source and the like at the time of image capturing. In the interpolation processing, adjustment is made such that a white object can be captured to be white when image capturing is performed using a digital camera, the camera-equipped mobile terminal 201, or the like. The image capturing unit 1401 detects, using a photodiode, light irradiated from a light source, such as the sun or a light, and reflected from a subject; accordingly, colors of an image will be different depending on the light source. Therefore, the color adjustment unit 1402 performs interpolation processing that accords with the light source.

As a typical method for interpolation processing, there is a method that uses kelvin (K) which is a unit in which a color of light expressed by a color temperature indicating a color of a light source is quantified. Generally, daytime sunlight is 5500 K and an incandescent lamp is 3000 K, and when the color temperature is high, an image appears blue and when the color temperature is low, an image appears red. Therefore, the colors of a captured image will be different depending on the light source. Generally, digital cameras, the camera-equipped mobile terminal 201, and the like are provided with a so-called auto white balance adjustment function, which detects a color temperature by a sensor at the time of image capturing and makes automatic adjustment so that a white subject can be captured to be white. It is also possible to manually adjust the white balance in accordance with the light source, such as sunlight or an incandescent lamp.

The color adjustment unit 1402 generates image data whose white balance is adjusted with respect to the output data of the photodiode. The image data (captured image) is sent to the additional information separation apparatus 203.

(1-5-3) Multiplexing Position Detection Unit

The multiplexing position detection unit 1403 takes, as input, image data on which color adjustment has been performed by the color adjustment unit 1402 and detects a position (multiplexing position) at which additional information is embedded by determining the frequency characteristics of the image data.

Figure 15A:
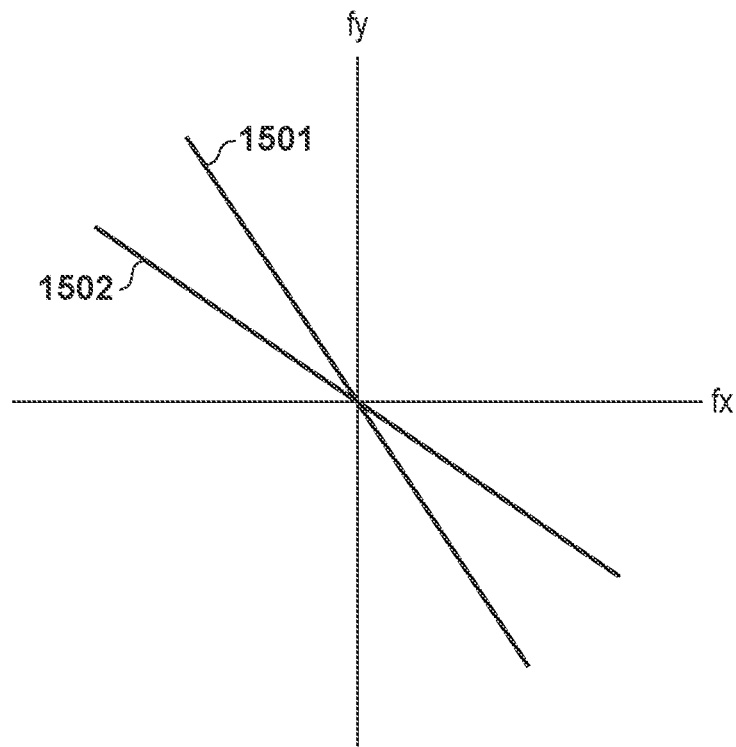
FIG. 15A is a diagram for explaining a difference in a frequency characteristic in a two-dimensional frequency region.

FIG. 15A is a diagram for explaining a difference in frequency characteristics in a two-dimensional frequency region; the horizontal axis represents a frequency in a horizontal direction, the vertical axis represents a frequency in a vertical direction, and the origin as the center indicates a DC component; and the higher the frequency region the further it is from the origin. In this example, frequency characteristics are changed by multiplexing processing.

For example, as previously described, a change in frequency characteristic when the mask pattern of FIG. 9A is applied results in a large power spectrum on a line 1501 in FIG. 15A. In addition, a change in frequency characteristic when the mask pattern of FIG. 9B is applied results in a large power spectrum on a line 1502 in FIG. 15A. When separating additional information, a frequency vector in which such a large power spectrum occurs is detected in order to determine a multiplexing signal. Therefore, each frequency vector is individually emphasized and extracted.

For this purpose, it is effective to use HPFs (High Pass Filters) with the same frequency characteristics as those of the mask patterns of FIG. 12A and FIG. 12B. A spatial filter corresponding to the mask pattern of FIG. 12A is capable of emphasizing a frequency vector on the straight line 1501 in FIG. 15A. A spatial filter corresponding to the mask pattern of FIG. 12B is capable of emphasizing a frequency vector on the straight line 1502 in FIG. 15A. For example, assume that a large power spectrum is generated on the frequency vector of the line 1501 in FIG. 15A by a quantization condition for applying the mask pattern of FIG. 12B. In this case, the amount of change in the power spectrum is amplified by the spatial filter corresponding to the mask pattern of FIG. 12A, but is hardly amplified by the spatial filter corresponding to the mask pattern of FIG. 12B. That is, when filtering is performed using a plurality of spatial filters in parallel, the power spectrum is amplified only by a spatial filter whose frequency vector coincides and is hardly amplified by other spatial filters. Therefore, by specifying a spatial filter that amplifies the power spectrum, it is possible to determine whether a large power spectrum has occurred on any frequency vector. By determining frequency characteristics in this way, it is possible to extract the additional information. At that time, when an additional information extraction position is shifted, it becomes difficult to extract it correctly.

Figure 15B:
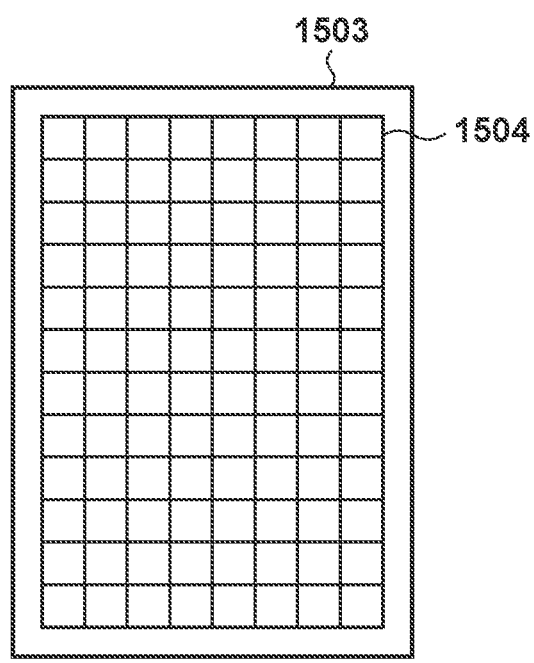
FIG. 15B is a diagram illustrating an example of a multiplexed block.

FIG. 15B is a diagram for explaining a printing region in the printed matter C. A printing medium 1503 as the printed matter C includes a region 1504 multiplexed in a plurality of block units, and additional information is embedded in the block unit region 1504 so as to have specific frequency characteristics.

Figure 16A:
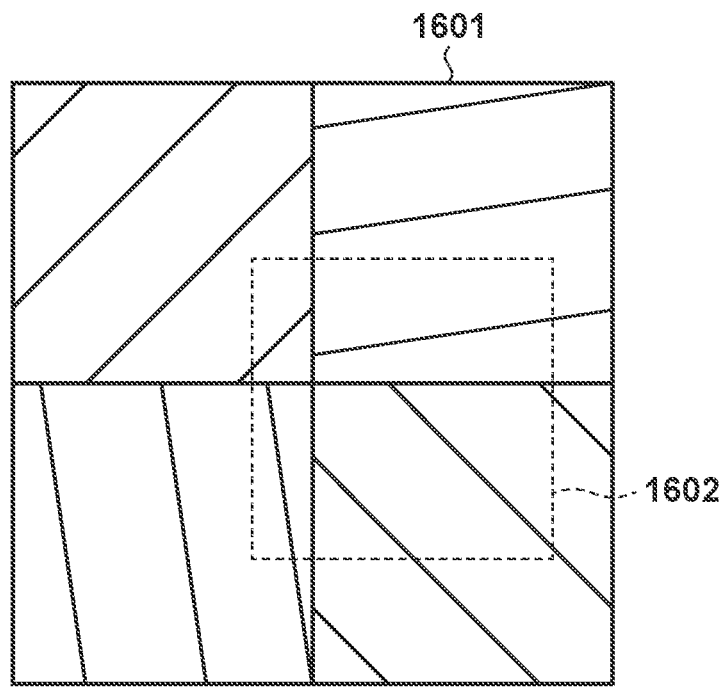
FIGS. 16A and FIG. 16B are diagrams for explaining of a relationship between a multiplexed block and a determination area of a frequency characteristic.
Figure 16B:
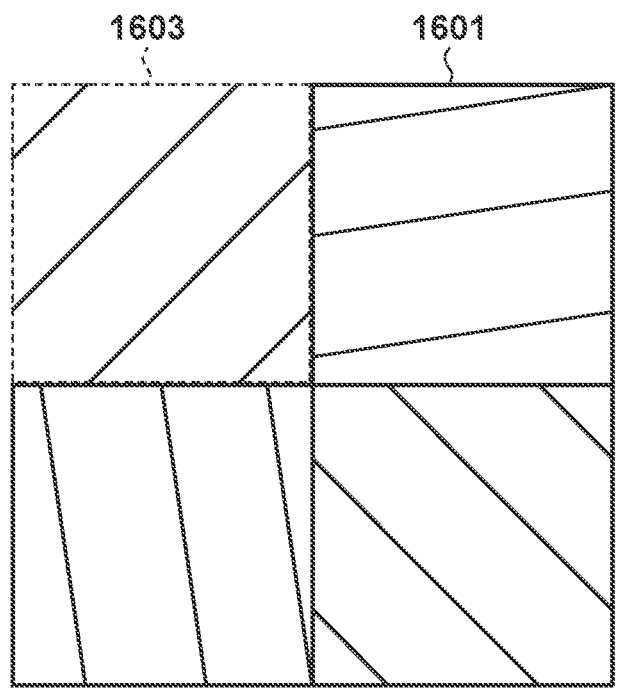

FIG. 16A and FIG. 16B are diagrams for explaining a relationship between a multiplexed block and a region for determining frequency characteristics, and the printing medium 1503 is multiplexed in four blocks. In FIG. 16A, a determination region 1602 for determining the frequency characteristics of a block unit is shifted from the position of a block, and in FIG. 16B, a determination region 1603 for determining the frequency characteristics of a block unit coincides with the position of a block. In the case of FIG. 16B, it is possible to correctly determine the frequency characteristics in the determination region 1603. Meanwhile, in FIG. 16A, the power spectrum of a particular frequency vector is lower in the determination region 1602; therefore, it is difficult to determine the frequency characteristic correctly.

The multiplexing position detection unit 1403 determines the frequency characteristics of a multiplexed block unit using a spatial filter. At that time, the position of a multiplexed block is specified. That position of a multiplexed block can be specified based on the intensity of the power spectrum of a particular frequency vector. Therefore, the multiplexing position detection unit 1403 detects frequency characteristics while shifting the region for determining the frequency characteristics of a block unit with respect to the captured image and, by determining the frequency characteristics, identifies the position of a multiplexed block. The amount by which the determination region is shifted may be one pixel unit for each of vertical and horizontal directions. For example, if one block is 5 pixels×5 pixels, it may be shifted by up to 4 pixels from the original position for each of vertical and horizontal directions. That is, frequency characteristics is detected by shifting the position at which a maximum spatial filter is applied in 5×5=25 ways, and the position at which the intensity of the power spectrum is the strongest may be determined as the position of a block in which a pattern is multiplexed.

(1-5-4) Additional Information Separation Unit

The frequency characteristic of a block unit is determined based on the position of a block detected by the multiplexing position detection unit 1403, and the additional information separation unit 1404 extracts multiplexed additional information based on a result of determination of the frequency characteristics of a block unit.

As in FIG. 15B, when the number of multiplexed blocks is set to a total 96 blocks (8 horizontal blocks×12 vertical blocks), for each of these blocks, additional information "0" and "1" are embedded by multiplexing encoding processing. The additional information embedded for each block is determined based on the frequency vector for each block. That is, regarding a block in which the frequency vector of the straight line 1501 in FIG. 15A exceeds a predetermined threshold value, the additional information embedded in the block is determined to be "0". In addition, regarding a block in which the frequency vector of the straight line 1502 in FIG. 15A exceeds a predetermined threshold value, the additional information embedded in the block is determined to be "1".

By shifting the region for determining frequency characteristics in block units based on the position of a block detected by the detection unit 1403, it is possible to determine the frequency characteristics of a total of 96 blocks in FIG. 15B and extract additional information embedded in each block. In this case, 1-bit-"0" or "1"—of additional information can be extracted for each block; therefore, a total of 96 bits of data can be extracted from a total of 96 blocks. Thus, by determining frequency characteristics while shifting the region for determining frequency characteristics, it is possible to extract multiplexed additional information from a plurality of blocks.

(1-5-5) Extracted Data Analysis Unit

The extracted data analysis unit 1405 analyzes a numeric string which is an extraction result separated as additional information by the additional information separation unit 1404 and converts the numeric string into an original form of additional information prior to embedding.

For example, a character code of additional information to be multiplexed is digitized in advance into "Shift-JIS" as text document data. In a single byte code (a half-width character) of Shift-JIS, conversion (digitization) corresponding to numeric values and characters is possible by a combination of upper 4 bits and lower 4 bits. For example, when the upper 4 bits are "0100" and the lower 4 bits are "0001", the numeric string is determined to be a character "A". Thus, a numeric string can be converted to a character by a conversion map being held in advance and associating the conversion map and the numeric string. For example, a numeric string separated as additional information may be temporarily held in the RAM 206 of FIG. 2, and a "Shift-JIS" conversion map may be held in advance by the secondary storage apparatus 207 so as to be capable of being referenced.

Assume a case where a numeric string "01101000011001010110110001101100001101111" is separated as additional information by the additional information separation unit 1404. This numeric string is converted by a conversion map as follows.

The upper 4 bits "0110" and the lower 4 bits "1000" are converted to a character "h".

The upper 4 bits "0110" and the lower 4 bits "0101" are converted to a character "e".

The upper 4 bits "0110" and the lower 4 bits "1100" are converted to a character "1".

The upper 4 bits "0110" and the lower 4 bits "1100" are converted to a character "1".

The upper 4 bits "0110" and the lower 4 bits "1111" are converted to a character "o".

Therefore, conversion to a character string "hello" is performed.

A character string thus extracted as additional information can be displayed on the display 208 of FIG. 2, for example. Further, when an extracted character string is a URL (Uniform Resource Locator), it is also possible to connect to a network by the wireless LAN 210 of FIG. 2 and display a screen of a URL destination on the display 208 using a browser. In addition, if that URL is a video site, a video may be displayed on the display 208 and audio may be played by the speaker 211. Further, a character string may be interpreted as a numeric value and used as a numeric value having a certain meaning.

(1-6) Multiplexing Decoding Processing

Figure 17:
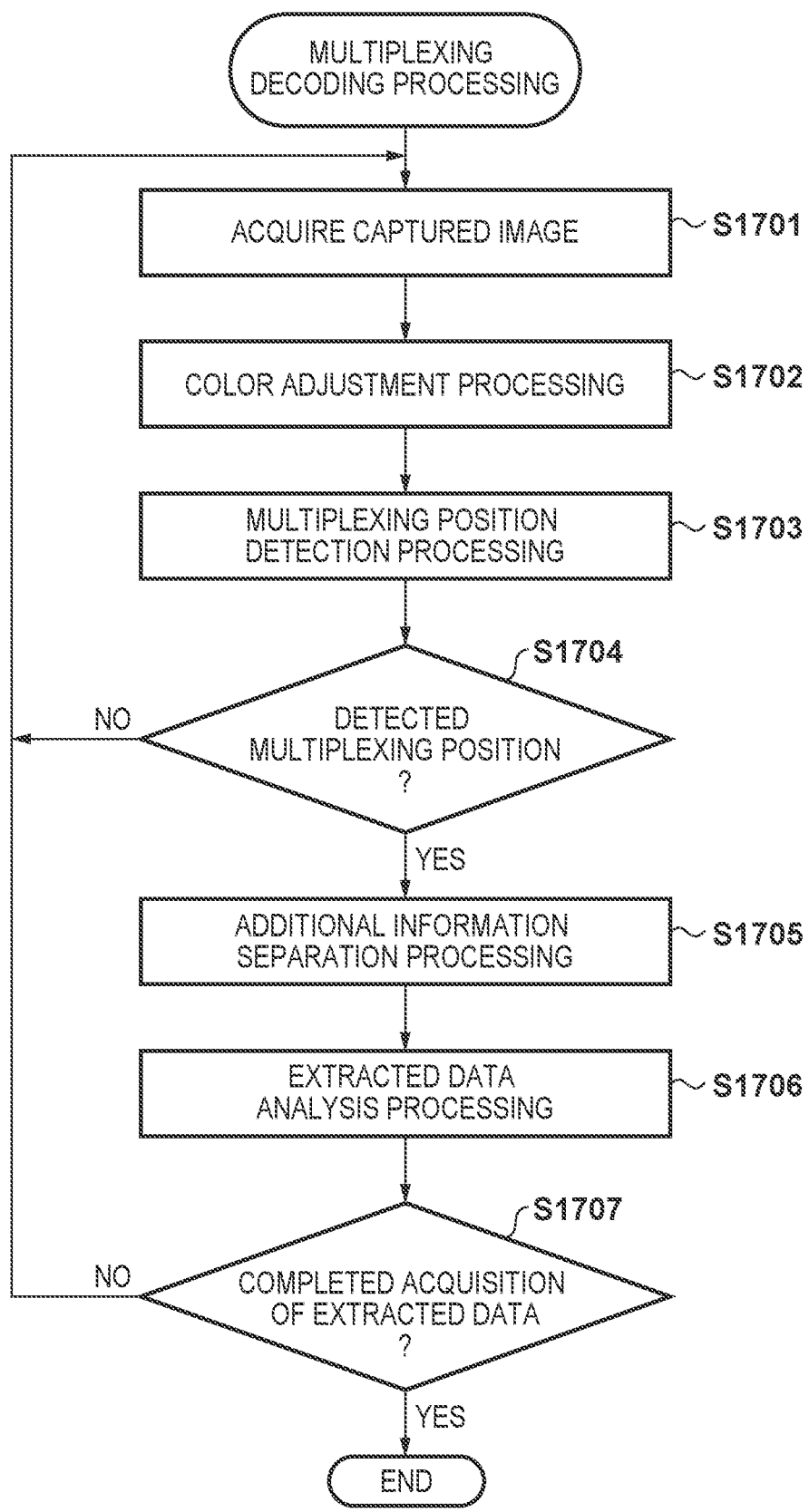
FIG. 17 is a flowchart of multiplexing decoding processing.

FIG. 17 is a flowchart for explaining multiplexing decoding processing in this example.

First, the image capturing unit 1401 of the image capturing sensor 202 of FIG. 14A in the camera-equipped mobile terminal 201 (see FIG. 2) captures a printed image of the printed matter C (step S1701). The captured light is converted into color data and then transmitted to the color adjustment unit 1402 in FIG. 14A. The color adjustment unit 1402 adjusts white balance of output data of a photodiode and generates image data (step S1702). The generated image data is transmitted to the additional information separation apparatus 203 of FIG. 2 and FIG. 8 or stored in the secondary storage apparatus 207 of FIG. 2. The multiplexing position detection unit 1403 of FIG. 14A detects a position being multiplexed as described above based on the image data whose white balance has been adjusted (step S1703). In step S1704, it is determined whether or not the multiplexing position detection unit 1403 has been able to detect a position of a block being multiplexed. If the multiplexing position detection unit 1403 has been able to detect the position, the processing proceeds to processing for separating the next additional information (step S1705), and if not, the processing returns to the previous step S1701.

In step S1705, the additional information separation unit 1404 of FIG. 14A determines frequency characteristics for each block based on the image data generated by the color adjustment unit 1402 and the position of a block detected by the multiplexing position detection unit 1403. Then, based on that determination result, the additional information being multiplexed is extracted as numerical data. The extracted numerical data is transmitted to the extracted data analysis unit 1405 of FIG. 14A or temporarily stored in the RAM 206 of FIG. 2 before being notified to the extracted data analysis unit 1405 of FIG. 14A.

Figure 18:
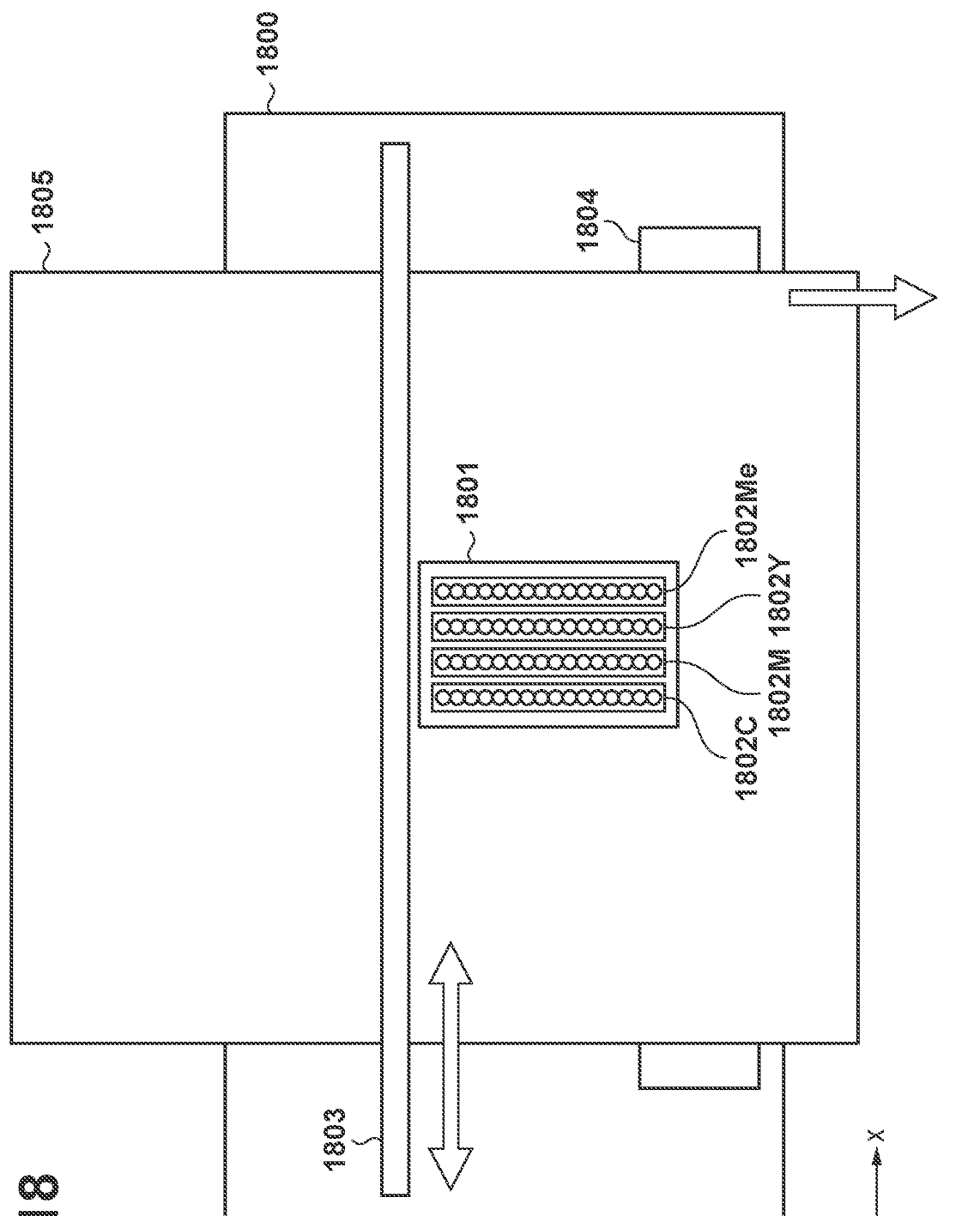
FIG. 18 is a schematic diagram of an inkjet printer.

Next, as described above, the extracted data analysis unit 1405 of FIG. 14A analyzes the numerical data extracted as additional information and converts the numerical data into additional information such as characters (step S1706). In the next step S1707, it is determined whether or not conversion to additional information by the analysis unit 1405 has been completed for all the extracted numerical data. When it has been completed, the multiplexing decoding processing of FIG. 18 is terminated, if it has not been completed, the processing returns to the previous step S1701. Additional information extracted as a character or the like can be displayed on the display 208 or the like of FIG. 2; it is also possible to access a network based on that additional information. Alternatively, it can be used for another purpose.

When additional information is not completely extracted from the printed matter C, it is considered that it is due to, for example, only a portion of a region in which the additional information is embedded being included in an image capturing region of the printed matter C. In this case, since only a portion of the additional information can be extracted, the printed matter C is captured again. The determination of whether or not additional information has been extracted can be performed by, for example, the additional information itself including in advance a value indicating the amount of data of the additional information and determining from the amount of data of the additional information from that value. In order to distinguish whether data as additional information is related to the amount of data or character data, a combination of numeric strings is predetermined, for example, and several bits immediately after the numeric strings are used as data related to the amount of data. In this example, as described above, a sequence of binary values "11111111" is defined as data for distinction.

In addition, when only a portion of the additional information can be extracted, only the extracted content may be stored in the secondary storage apparatus 207 of FIG. 2, and the additional information extracted by the subsequent processing may be combined with the stored portion of the additional information, for example. Thus, additional information may be extracted in a divided manner over a plurality of times. Further, the additional information extracted in a divided manner over a plurality of times, it may be sequentially displayed on, for example, the display 208 of FIG. 2.

(1-7) Print Processing Using Metallic Ink

In the first embodiment of the disclosure, image data after multiplexing encoding processing is printed by a printing apparatus provided with metallic color ink. Here, print processing using metallic color ink will be described. The print processing using metallic color ink is also referred to as "metallic color printing".

(1-7-1) Printing with Inkjet Printer

FIG. 18 is a diagram schematically illustrating an inkjet printer according to the first embodiment of the disclosure. As illustrated in FIG. 18, a printer 1800 includes a print head 1801 on a frame that forms a structural material of the printer. The print head 1801 is provided with a plurality of nozzles for ejecting ink, and in the present example, a nozzle 1802C for cyan ink, a nozzle 1802M for magenta ink, a nozzle 1802Y for yellow ink, and a nozzle 1802Me for metallic color ink are provided.

The printer 1800 is of a so-called serial printing type in which nozzles are arranged in a direction (Y direction) perpendicular to a width direction of a printing sheet 1805 and performs printing by scanning the print head 1801 in an X direction along a guide 1803. The resolution of the nozzle arrangement of a nozzle row of each ink color is 1200 dpi in this example.

The printing sheet 1805 serving as a printing medium is conveyed in the Y direction in the figure by a conveyance roller 1804 (and another roller (not illustrated)) rotated by a driving force of a motor (not illustrated). Then, after the printing sheet 1805 is fed, ink is ejected from a plurality of (a predetermined number of) nozzles of the print head 1801 in accordance with print data, so that an image of one scan width corresponding to the nozzle rows of the print head is printed. After printing, the printing sheet 1805 is conveyed in the direction of an arrow in the figure by the width corresponding to the nozzle rows again, and an image of one scan width is printed again. It is also possible to make a feeding amount of a printing sheet smaller than the printing width of the print head and form an image by performing a plurality of scans by the print head 1801.

By repeating the conveyance of the printing sheet and operation for ejecting ink from each print head onto the printing sheet, an image of one page, for example, can be printed. A printing apparatus to which the disclosure is applicable is not limited to a serial printing type apparatus described above. For example, the disclosure can also be applied to a so-called full-line type printing apparatus in which a print head is arranged in a conveyance direction of a printing sheet and printing is performed in synchronization with the conveyance of the printing sheet.

(1-7-2) Hardware Configuration of Inkjet Printer

Figure 19:
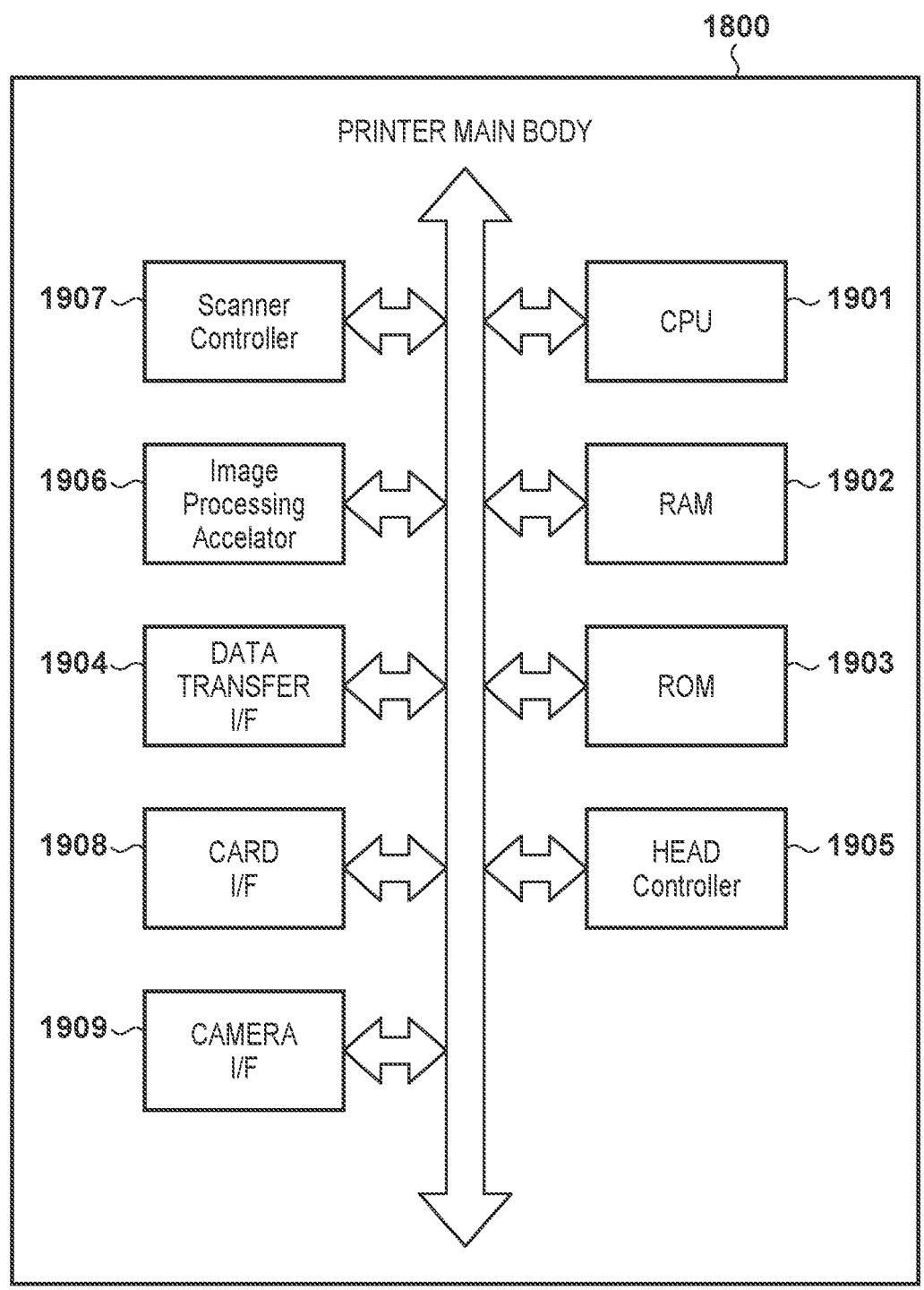
FIG. 19 is a hardware block diagram of the inkjet printer.

FIG. 19 is a block diagram illustrating a hardware configuration of the inkjet printer according to the first embodiment of the disclosure.

The printer 1800 is mainly configured to include the following elements. A CPU 1901 executes processing in accordance with a program held in a ROM 1903 and a RAM 1902. The RAM 1902 is a volatile storage that temporarily holds programs and data. Further, the ROM 1903 is a non-volatile storage and can hold table data created in the respective processes and programs. A data transfer I/F 1904 controls transmission and reception of data between a personal computer (PC) (not illustrated), a mobile terminal such as a smartphone or a tablet as illustrated in FIG. 2, and a server (not illustrated). As a connection method for this data transmission and reception, USB, IEEE 1394, LAN, or the like can be used depending on the connection partner. A head controller 1905 supplies print data to the print head 1801 illustrated in FIG. 18 and controls an ejection operation of the print head. Specifically, the head controller 1905 may be configured to read control parameters and print data from a predetermined address of the RAM 1902. Then, when the CPU 1901 writes the control parameters and the print data to the above predetermined address in the RAM 1902, processing is started by the head controller 1905 and ink is ejected from the print head 1801. An image processing accelerator 1906 is configured by hardware and performs image processing faster than the CPU 1901. Specifically, the image processing accelerator 1906 may be configured to read parameters and data for image processing from a predetermined address of the RAM 1902. Then, when the CPU 1901 writes the above parameters and data to the above predetermined address in the RAM 1902, the image processing accelerator 1906 is started, and predetermined image processing is performed. The image processing accelerator 1906 is not necessarily an essential element, and depending on the specifications of the printer, for example, it is of course possible to execute the above-described table parameter creation processing and image processing only by processing by the CPU 1901.

(1-7-3) Image Data for Metallic Printing

Figure 20A:
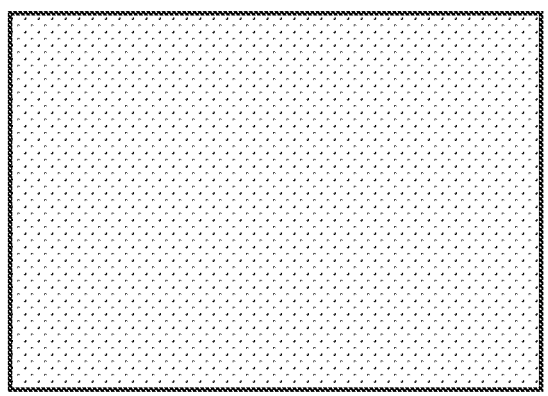
FIGS. 20A and FIG. 20B are diagrams illustrating an example of input image data.
Figure 20B:
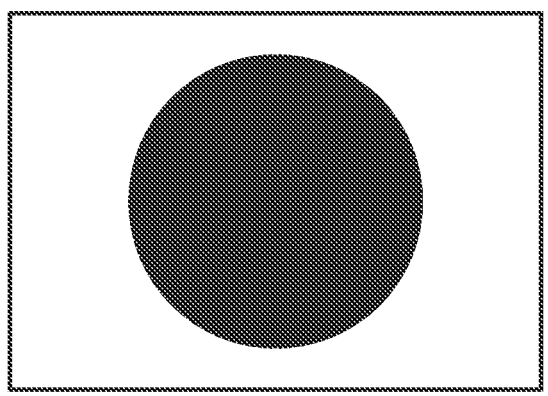

There are two types of image data to be input for print processing using metallic color ink. One is, for example, image data for three color inks (called color image data) and the other is image data for metallic color ink (called metallic color image data). The color image data is an image in which each pixel has a value of a plurality of color components for representing a standardized color space such as an sRGB. The metallic color image data is a gray scale image of the same size as the color image. FIG. 20A and FIG. 20B are examples of input image data. In the input image data, both color ink and metallic color ink are printed in a region (a region of the circle in the center of FIG. 20B) where a color image (FIG. 20A) and a metallic color image (FIG. 20B) overlap. Only color ink is printed in the other regions. In this case, the former is classified as a metallic color region and the latter as a color region. Hereinafter, it is assumed that color image data is an image in which each pixel has a value of 3 channels, specifically, a value of 8 bits for each RGB channel, and that metallic color image data is an image in which each pixel has a value of 8 bits.

(1-7-4) Printing Operation for Metallic Printing

Figure 21:
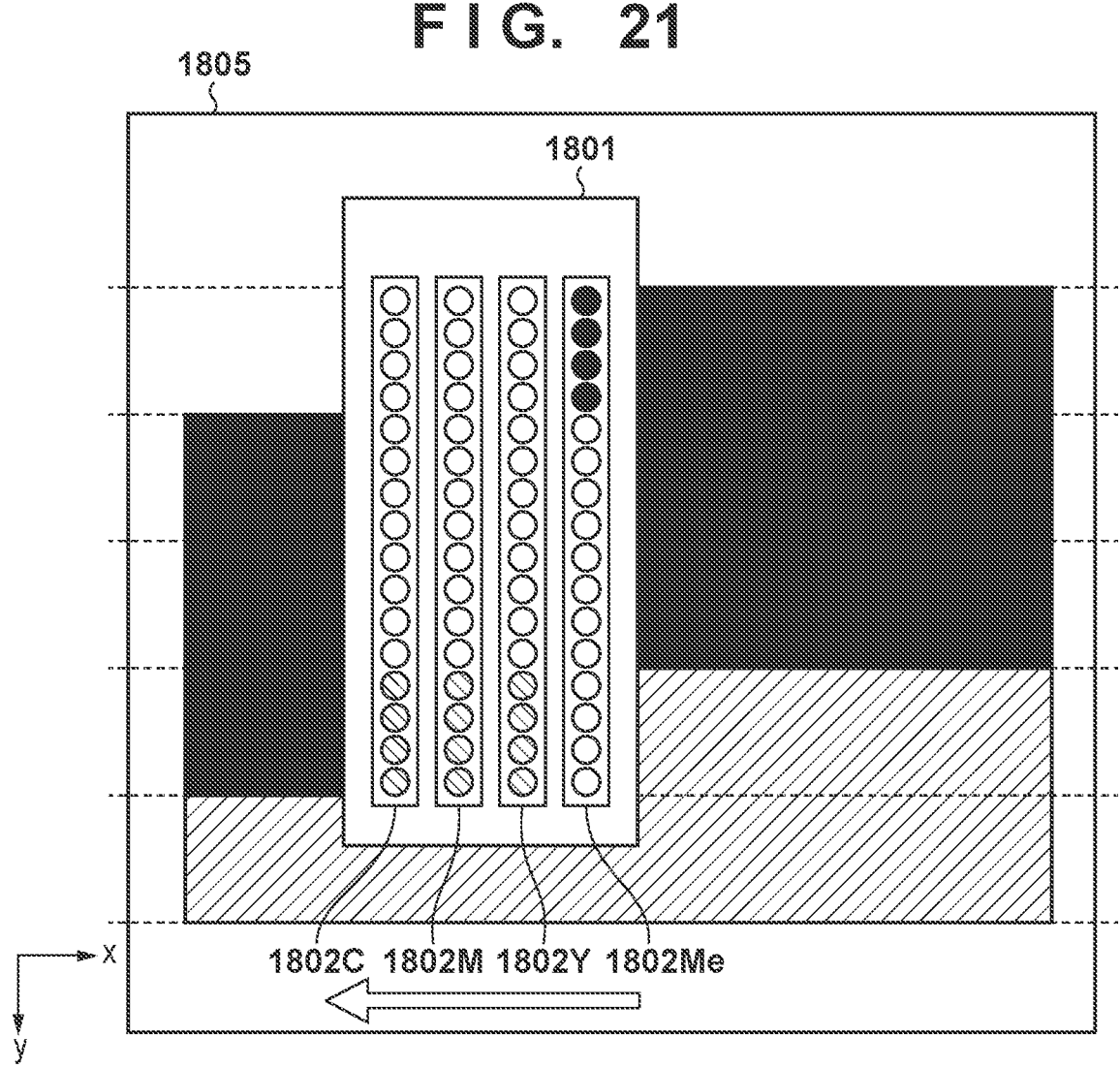
FIG. 21 is a schematic diagram of an arrangement of nozzles of a print head and printing operation.

FIG. 21 is a diagram schematically illustrating an arrangement of a nozzle row of each ink in the print head 1801 and a state in which a printing operation is actually performed by nozzles for ejecting ink. When performing image formation using both metallic color ink and color ink in the same region on a paper surface, it is necessary to pay attention to the timing of ejecting each ink. Specifically, metallic color ink is to be ejected first, and after setting aside a time difference that is greater than or equal to a fixed value, eject color ink. In order to simplify the description, a description will be given using a case where the number of nozzles in each nozzle row 1802 is 16 and an image is formed in one pass (a single scan of a forward path or a return path) as an example.

Assume that when first ejecting metallic color ink, the nozzles that actually eject ink among the nozzles included in the nozzle row 1802Me are four nozzles at a leading end indicated by blackening in the figure. Assume that when next ejecting each of the color inks C, M, and Y, the nozzles that actually eject ink among the nozzles included in each of the nozzle rows 1802C, 1802M, 1802Y are four nozzles at a trailing end indicated by hatching. Here, in each nozzle row, a nozzle existing on a leading end side from the center is referred to as a conveyance direction upstream nozzle (simply referred to as an upstream nozzle). Meanwhile, a nozzle existing on a trailing end side from the center is referred to as a conveyance direction downstream nozzle (simply referred to as a downstream nozzle). In the present embodiment, an amount of conveyance of a printing medium is set to an amount of 4 nozzles, so that color ink can be ejected after first ejecting metallic color ink.

In FIG. 21, the black portion on the recording medium 1805 represents an area recorded with metallic color ink. Meanwhile, a portion indicated by hatching represents a region printed with color ink after being printed with metallic color ink. It can be seen that by ejecting metallic color ink from a leading end nozzle and ejecting color ink from a trailing end nozzle, two types of ink are applied to the same region of the printing medium 1805 at different timings.

Further, in the present embodiment, as illustrated in FIG. 21, eight nozzles that exist between the nozzles (four nozzles at the leading end) that actually eject metallic color ink and the nozzles (four nozzles at the trailing end) that actually eject color ink are controlled so as not to eject the ink. A region in which neither metallic color ink nor color ink is ejected as described above is called a "blank nozzle region". By providing a blank nozzle region, it is possible to apply metallic color ink and color ink on a paper surface with a sufficient time difference. In the case illustrated in FIG. 21, a time difference corresponding to an amount of at least three times of main scanning is provided from when metallic color ink is applied to when color ink is applied. Thus, it is possible to secure a time sufficient for metallic color ink applied on a printing medium to dry. As a result, it is possible to reliably form a metallic color ink layer and a color ink layer on a printing medium and realize a metallic color representation in which both high glossiness and saturation is achieved.

The number of nozzles to be used and a conveyance amount is not limited to those described above. For example, the nozzles for actually discharging metallic color ink in the nozzle row of metallic color ink may be set to six nozzles at the leading end, and the nozzles for actually discharging each color ink in the nozzle row of each color ink may be set to six nozzles at the trailing end. Alternatively, the nozzles for actually discharging metallic color ink in the nozzle row of metallic color ink may be set to three nozzles at the leading end, and the nozzles for actually discharging each color ink in the nozzle row of each color ink may be set to six nozzles at the trailing end. At this time, by setting an amount of conveyance of a printing medium to be 3 nozzles, the number of times the nozzles that can eject color ink is scanned can be increased, and more color ink can be ejected in the same region.

(1-7-5) Printed Matter of Metallic Printing

Figure 22A:
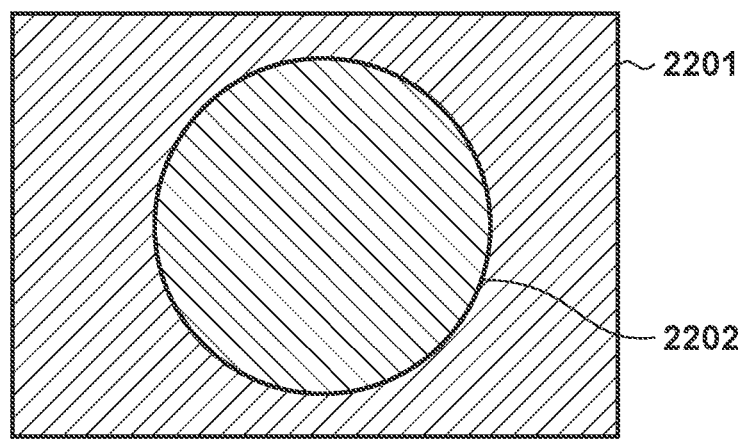
FIGS. 22A, FIG. 22B, and FIG. 22C are diagrams illustrating an example of printed matter.
Figure 22B:
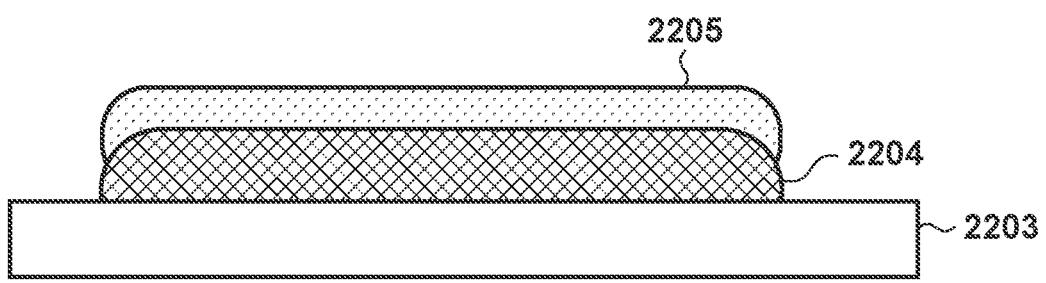
Figure 22C:
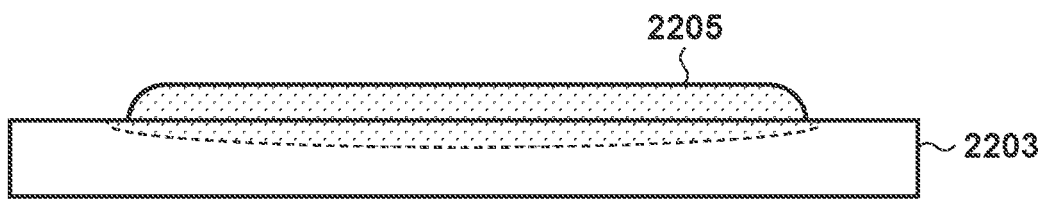

FIG. 22A, FIG. 22B, and FIG. 22C are diagrams illustrating a printed matter that is output when the printing operation described in FIG. 21 is performed based on the image data illustrated in FIG. 20A and FIG. 20B. FIG. 22A is printed matter outputted by metallic color printing. An image is formed on a region 2201 with only color ink. An image is formed on a region 2202 with both color ink and metallic color ink. FIG. 22B is a cross-sectional view of the region 2202. FIG. 22C is a cross-sectional view of the region 2201. In FIG. 22B, a metallic color ink layer 2204 is first formed on the printing medium 2203, and a color ink layer 2205 is formed thereon. In FIG. 22C, the color ink layer 2205 is formed on the printing medium 2203 without the metallic color ink layer 2204.

(2) Characteristic Configuration

In the present embodiment, a characteristic configuration is added with respect to the above-described basic configuration of the multiplexing decoding processing unit.

In the disclosure, additional information embedded in printed matter by metallic color printing is extracted. Here, a case where additional information is embedded in the color image illustrated in FIG. 20A will be described. When print processing for metallic color printing is performed in a state in which additional information is embedded in the color image of FIG. 20A, the additional information is embedded by color ink on the entire surface of the printed matter of metallic color printing illustrated in FIG. 22A. However, in the region 2201, a pattern for embedding additional information with color ink directly on a paper surface is formed, whereas in the region 2202, a pattern for embedding additional information with color ink is formed on a metallic color ink layer formed on the paper surface.

Figure 23A:
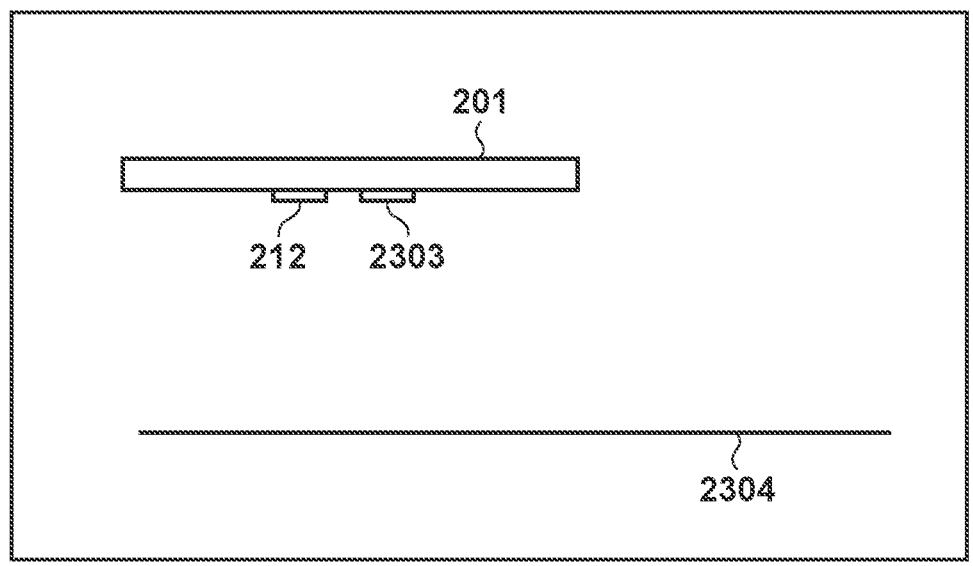
FIGS. 23A and FIG. 23B are diagrams illustrating manners in which additional information embedded in printed matter is extracted.
Figure 23B:
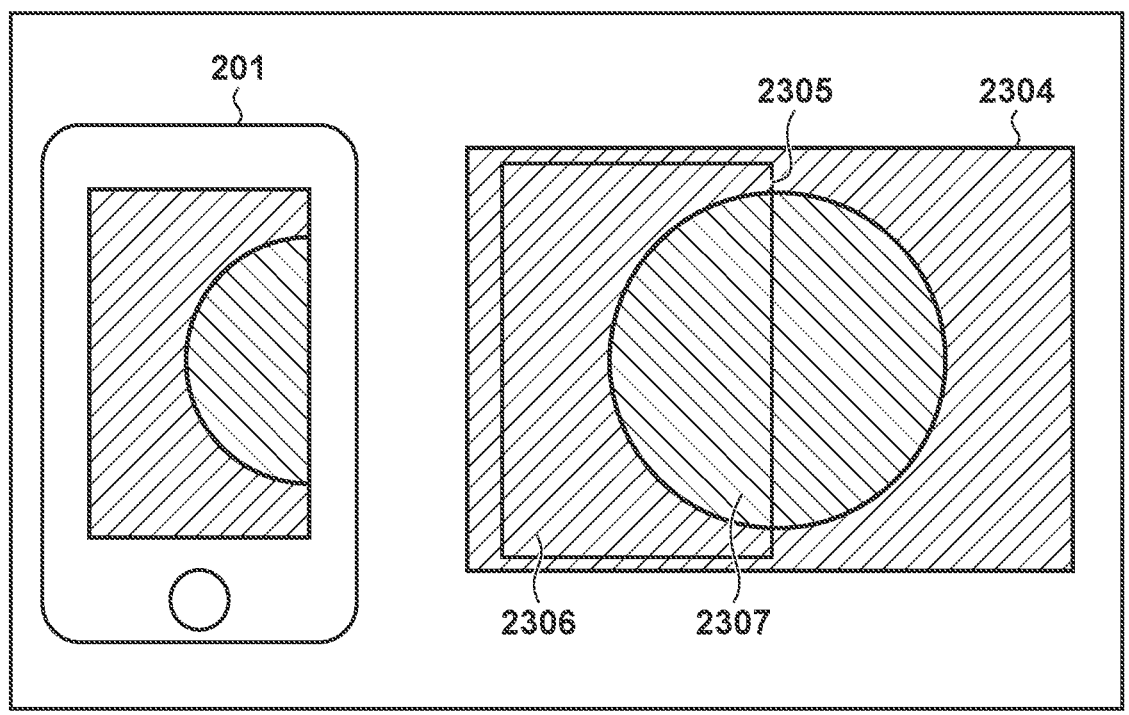

FIG. 23A and FIG. 23B illustrate a manner in which multiplexing decoding processing, in which additional information embedded in printed matter 2304 by metallic color printing is extracted, is performed using the camera-equipped mobile terminal 201. In FIG. 23A, the camera-equipped mobile terminal 201 has an illumination unit (light) 212 and a lens unit 2303 on its exterior. Light is irradiated from the light 212 toward the printed matter 2304, which is a subject, and reflected light is received by the lens unit 2303. The lens unit 2303 includes the image capturing sensor 202 (see FIG. 2), and light focused by a lens is captured by the image capturing sensor 202. In FIG. 23B, a region 2305 is a region captured by the camera-equipped mobile terminal 201. In the present embodiment, it is assumed that the image capturing region 2305 includes both a region 2306 on which an image is formed with only color ink and a region 2307 on which an image is formed with color ink and metallic color ink. The region 2306 may be referred to as a non-metallic color region or a color region, and the region 2307 may be referred to as a metallic color region.

Figure 24:
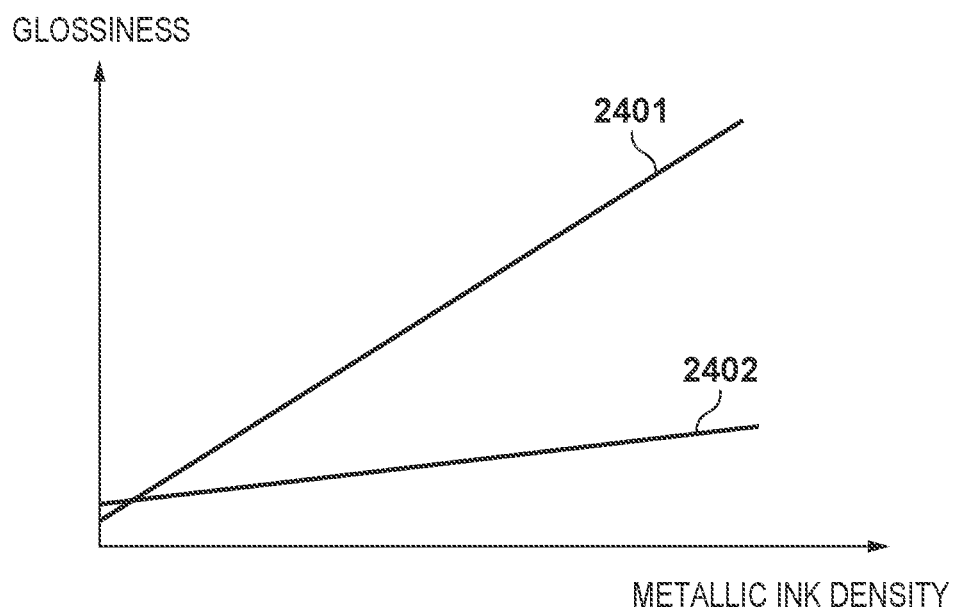
FIG. 24 is a diagram illustrating an example of a relationship between metallic color ink density and glossiness of printed matter.

FIG. 24 is a graph representing a relationship between a metallic color ink density (amount of metallic color ink per unit surface area on a paper surface) and a glossiness of printed matter. A graph 2401 illustrates a case where a printing medium is glossy paper. Metallic ink dramatically increases in glossiness depending on the amount of ink to be printed on a paper surface. Although glossiness depends on the type of metallic color ink and the amount of ink to be printed, when an effective glossiness is obtained by metallic color ink, the glossiness is a value that is several times to several tens of times that of paper white (a state in which no ink is printed on a paper surface). Meanwhile, regarding color ink, even if an amount of ink to be printed on a paper surface is increased, the glossiness of printed matter does not change substantially from the glossiness of paper white (not illustrated). The graph 2402 of FIG. 24 will be described in a second embodiment.

Therefore, the glossiness of the region 2306 on which an image is formed with only color ink and the glossiness of the region 2307 on which an image is formed with color ink and metallic color ink are greatly different. As a result, when light is irradiated to the printed matter 2304 by the light 212 at the time of performing image capturing for extracting additional information, reflection intensity is greatly different in the region 2306 and the region 2307. Specifically, the reflection intensity of the color region 2306 is smaller than the reflection intensity of the metallic color region 2307. As a result, in an image captured by irradiating the light of a luminous flux value appropriate for extracting the additional information embedded in the metallic color region 2307, the signal intensity of the additional information embedded in the region 2306 is small; therefore, it is difficult to extract the additional information embedded in the region 2306.

Figure 25:
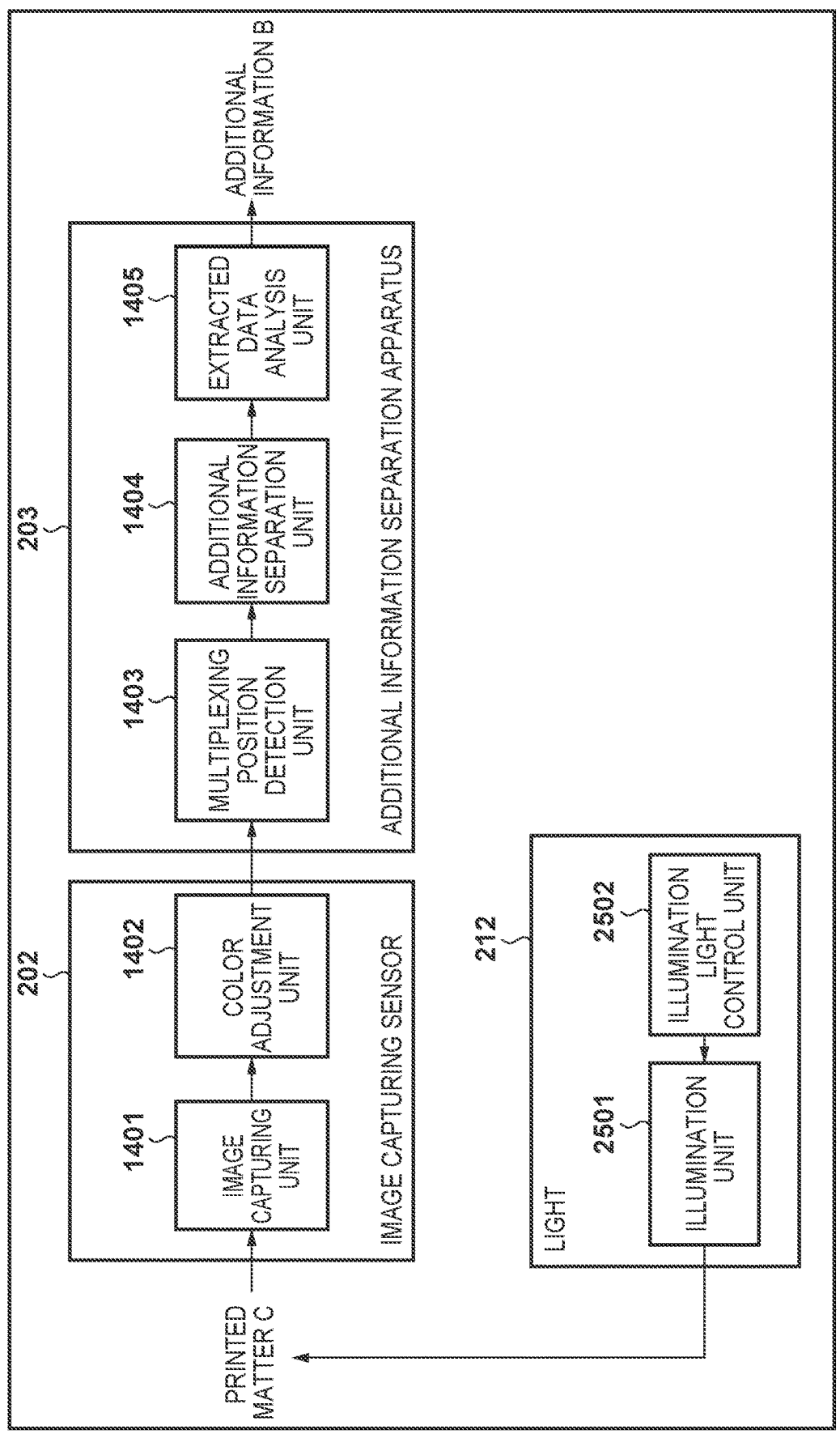
FIG. 25 is a diagram of a firmware configuration for multiplexing decoding processing.

FIG. 25 illustrates a firmware configuration for multiplexing decoding processing for solving the issue of the disclosure. Assume that hardware for control by firmware, such as hardware for illumination light control, is provided. A difference from FIG. 14A is the light 212 for irradiating light on the printed matter C. The light 212 is configured by an illumination unit 2501 and an illumination light control unit 2502. The illumination light control unit 2502 controls a luminous flux value (or a light amount) of light irradiated on printed matter at the time of image capturing so as to be able to extract additional information embedded from each of the region 2306 and the region 2307.

Figure 26A:
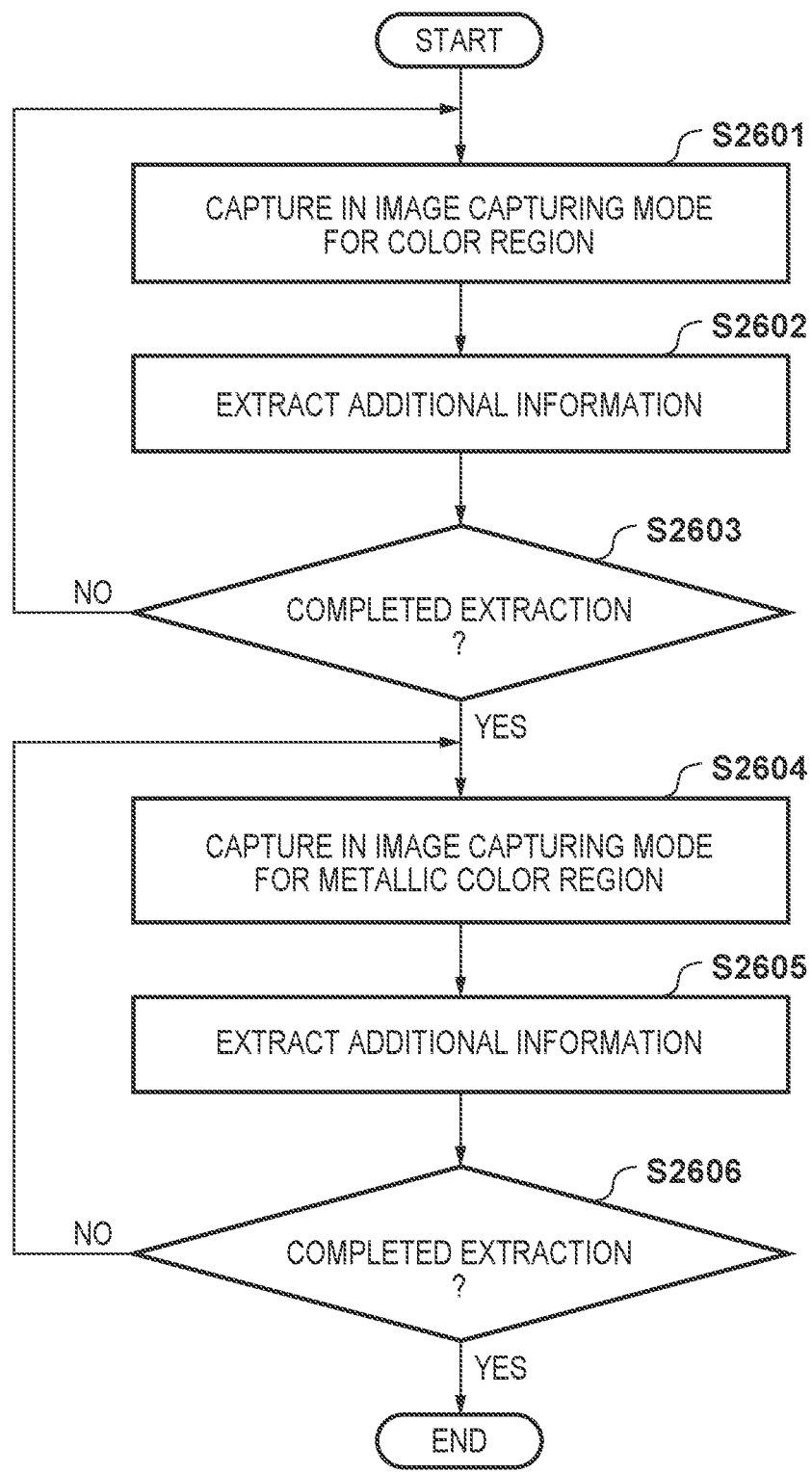
FIGS. 26A and FIG. 26B are flowcharts of multiplexing decoding processing of a variation of a first embodiment.

FIG. 26A is a flowchart of multiplexing decoding processing. The procedure of FIG. 26A is executed, for example, by the CPU 204 of the mobile terminal 201 with a camera or by a CPU such as an information processing apparatus to which a scanner is connected. Alternatively, it may be executed by a copying machine provided with a scanner or the like. This flow is executed from step S2601, for example, when an application program of the procedure of FIG. 26A is started and an instruction for starting execution is made in a state in which a camera is pointed at a target image. Alternatively, the procedure of FIG. 26A may be performed as part of an application utilizing additional information, and extracted additional information may be utilized by the application. The same applies to the flowcharts of FIG. 26B, FIGS. 27A, 27B, and FIG. 28.

In step S2601, image capturing is performed in an image capturing mode for extracting additional information embedded in the color region 2306. In step S2602, additional information embedded in the region 2306 is extracted from an image captured in step S2601. In step S2603, it is determined whether or not the extraction processing of step S2602 has been completed. If it has not been completed, the processing returns to the processing of step S2601. If it has been completed, the processing proceeds to the processing of step S2604.

In step S2604, image capturing is performed in an image capturing mode for extracting additional information embedded in the region 2307. In step S2605, additional information embedded in the metallic color region 2307 is extracted from the image captured in step S2604. In step S2606, it is determined whether or not the extraction processing of step S2605 has been completed. If it has not been completed, the processing returns to the processing of step S2604. If it has been completed, the processing is terminated.

Here, the illumination light control unit 2502 controls the light of the illumination unit 2501 so that a luminous flux value of the light irradiated in the image capturing mode of step S2601 is larger than a luminous flux value of the light irradiated in the image capturing mode of step S2604. Alternatively, the illumination light control unit 2502 controls the light of the illumination unit 2501 so that the luminous flux value of the light irradiated in the image capturing mode of step S2604 is smaller than the luminous flux value of the light irradiated in the image capturing mode of step S2601. This is to increase the signal strength of the additional information embedded in the color region 2306 to an extractable size in the image captured in step S2601. Further, if the signal strength of the additional information embedded in the metallic color region 2307 weakly remains in the image captured in step S2601, it may become noise in the extracting processing of step S2602. That is, the additional information of the metallic color region 2307 is detected in an incomplete state, thereby preventing proper extraction processing. Consequently, the reliability of the additional information extracted in step S2602 is reduced.

To alleviate this issue, a luminous flux value of the light irradiated in the image capturing mode of step S2601 is controlled such that pixels included in the metallic color region 2307 in the captured image overflows as much as possible. An overflow (saturation) refers to a state in which a shift occurs in a bright direction from the dynamic range that an image capturing element has in the image capturing unit. It is also referred to as overexposure. Consequently, in the extracting processing of step S2602, the additional information of the metallic color region 2307 in the image captured in step S2601 is hardly detected.

From the above, by irradiating with a light amount corresponding to the presence or absence of an image by metallic color ink, it is possible to extract additional information embedded in each of the color region and the metallic color region whose reflection intensities are different. As described above, the amount of light of the light 212 may be determined by performing adjustment in advance so that the color region 2306 and the metallic color region 2307 can each be captured. Further, the amount of light for capturing the color region 2306 may be determined so that the brightness of the metallic color region 2307 becomes saturated. Further, the amount of light for capturing the metallic color region 2307 may be determined so that the brightness of the metallic color region 2307 does not become saturated. Here, the adjustment of the amount of light of the light 212 is performed by the illumination light control unit 2502. This is done by controlling an applied voltage of an LED, for example, by PWM control, as described in the description of FIG. 2. For example, it is possible to adjust the light 212 by setting by the CPU 204 a parameter for determining a duty cycle of PWM to achieve the amount of light determined for each of the metallic color region and the color region.

Alternatively, the luminous flux of the light 212 may be determined using the average luminance value of a captured image. For example, a luminous flux of the light 212 is set to a predetermined value prior to step S2601 of FIG. 26A, and in that state, an image is captured. The light 212 is adjusted so that the average of brightness values of that image is a median value of the dynamic range, and the execution is started from step S2601 of FIG. 26A. At this time, a configuration may be taken so as to divide the image into several regions, determine a region having an average luminance exceeding the average luminance of the entire image, estimate that the region is a metallic color region, and adjust the light 212 such that an average luminance obtained by excluding the region to be a median value of the dynamic range. In step S2604, image capturing may be performed with the luminous flux value lowered by a value determined in advance, for example, by measuring using the luminous flux of step S2601 as a reference.

In the present embodiment, a description has been given for a case where additional information is embedded in a color image of metallic color printing, but the additional information may be embedded in a metallic color image. However, when additional information is embedded in a metallic color image, the additional information is embedded using a pattern of density of metallic color ink; therefore, a luminance component of a captured image during extraction processing is to be analyzed. Additional information may be embedded in both a color image and a metallic color image. In this case, in order to extract the additional information embedded in the color image, a color difference component of a captured image need only be analyzed, and in order to extract the additional information embedded in a metallic color image, a luminance component of a captured image need only be analyzed. In addition, when additional information is embedded in the same regions of each of a color image and a metallic color image, if the additional information is embedded in the same frequency band, interference may occur at the time of extraction. Therefore, the additional information of a color image and the additional information of a metallic color image are embedded in different frequency bands from each other. If both frequencies are known, additional information can be extracted by analyzing that frequency band at the time of extraction.

In FIG. 26A, additional information is first extracted from a color region and then extracted from a metallic color region; however, this order may be switched. The same applies to FIGS. 27A and 27B. Further, the procedure of FIG. 26A may be performed for printed matter in which the entire surface is a metallic color region. As described above, an image is irradiated by a light source, such as a light, at a luminous flux value (a light amount) corresponding to the reflection intensity (or reflectance) of a medium on which an image is formed, and image capturing is performed. This makes it easier to extract additional information and also improves the accuracy of extraction.

Variation of First Embodiment

In the first embodiment, both a color region and a metallic color region are included in a captured image for extracting additional information, but the disclosure is not limited thereto. Similar effects is obtained even when only a color region is included in a captured image or only a metallic color region is included in a captured image. The same applies to a case where processing for extracting additional information is performed separately from printed matter having only a color region and printed matter having only a metallic color region.

Figure 26B:
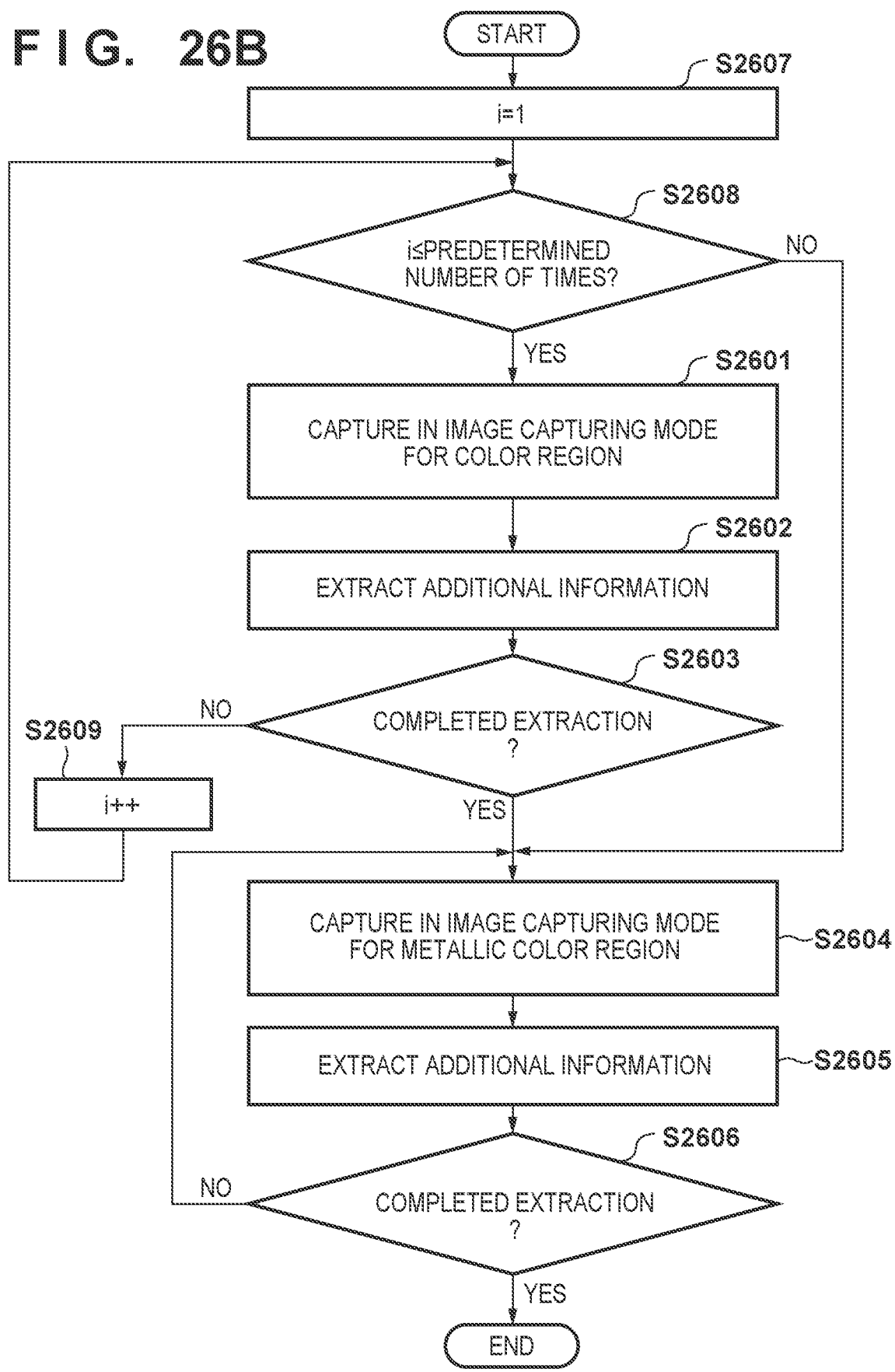

A flowchart of multiplexing decoding processing at that time is illustrated in FIG. 26B. The differences from FIG. 26A are step S2607, step S2608, and step S2609. In FIG. 26B, by adding these steps, the number of tries is counted by a counter i, and when additional information embedded in a color region cannot be extracted by a predetermined number of tries (No in step S2608), the processing proceeds to the processing for extracting additional information embedded in a metallic color region. As a result, embedded additional information can be extracted even when only one of a color region and a metallic color region is included in a captured image. In a case where processing for extracting additional information is performed separately from printed matter having only a color region and printed matter having only a metallic color region, the designation of an image capturing mode may be received from the user in advance (not illustrated).

Second Embodiment

As illustrated in the graph 2401 of FIG. 24, glossiness varies greatly depending on the amount of metallic color ink per unit surface area on a paper surface. Further, a graph 2402 of FIG. 24 illustrates a relationship between metallic color ink density and glossiness on semi-glossy paper having lower smoothness of paper surface than glossy paper. Because the smoothness of paper surface is lower than that of glossy paper, the degree of increase in glossiness with respect to the amount of ink on the paper surface in the graph 2402 of semi-glossy paper is smaller than that of the graph 2401 of glossy paper. As described above, glossiness varies greatly depending on the amount of metallic color ink to be printed on the paper surface and the type of printing medium to be used. When there are a plurality of types of printing media to be embedded with additional information, or when there are a plurality of amounts of metallic color ink to be printed on a printing medium, a metallic color region has a plurality of image capturing modes. In the first embodiment, there is one image capturing mode for a metallic color region, but in the present embodiment, a description will be given for an example in which there are a plurality of image capturing modes for a metallic color region.

In order to extract embedded additional information from each of a plurality of metallic color regions having different reflection intensities, the luminous flux value of light to be irradiated at the time of image capturing is set to an appropriate value corresponding to a reflection intensity. An appropriate value is a value for detecting additional information embedded in a metallic color region of interest from a photographed image with sufficient intensity for extraction. In the present embodiment, luminous flux values suitable for metallic color regions of respective reflection intensities that are targets of multiplexing decoding processing are obtained in advance and assigned to respective image capturing modes for a metallic color region. When an image capturing mode k is invoked, the luminous flux value of light illuminated by the illumination unit 2501 is controlled by the illumination light control unit 2502 so as to be a value assigned in advance in association with the image capturing mode k.

Figure 27A:
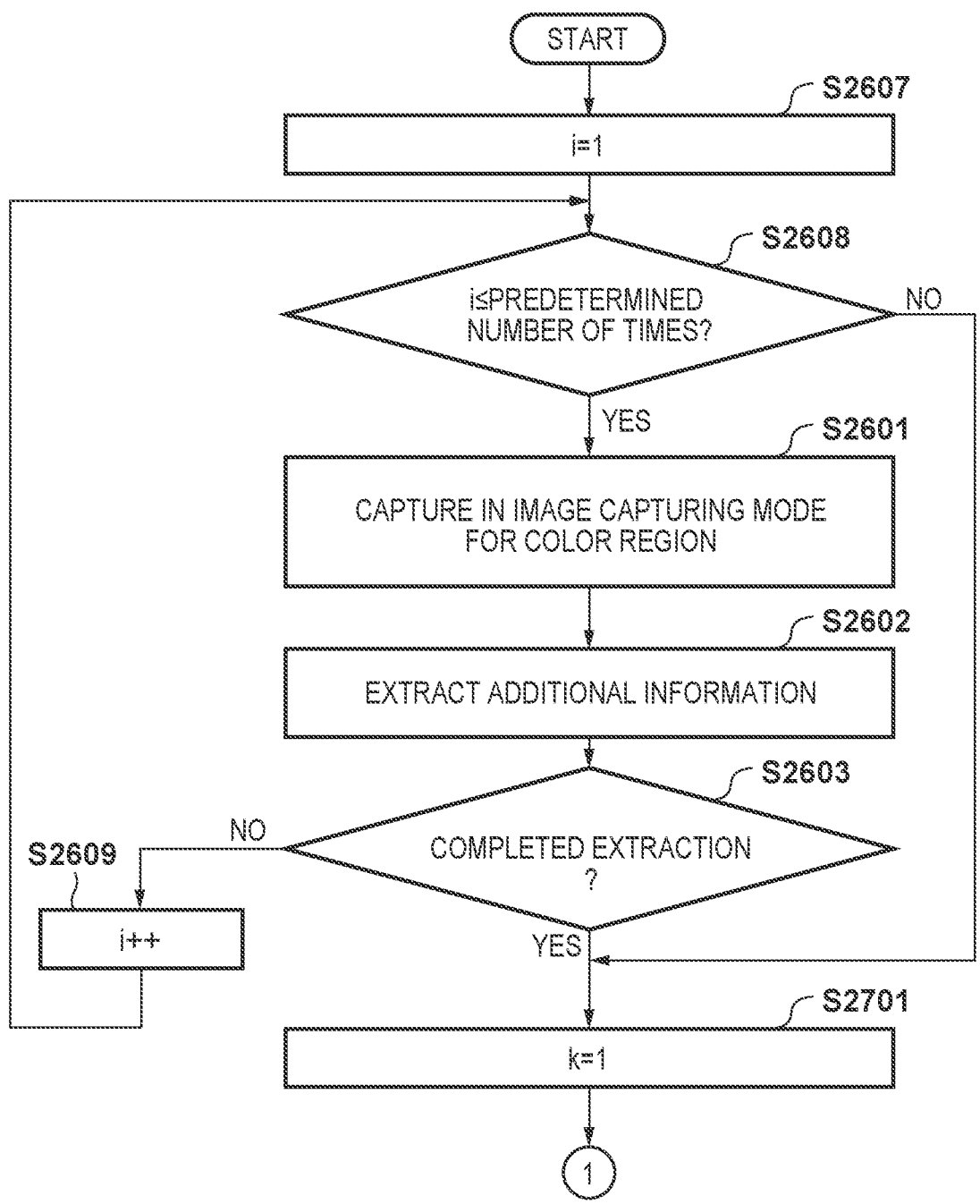
FIGS. 27A and FIG. 27B are flowchart of multiplexing decoding processing of a second embodiment.
Figure 27B:
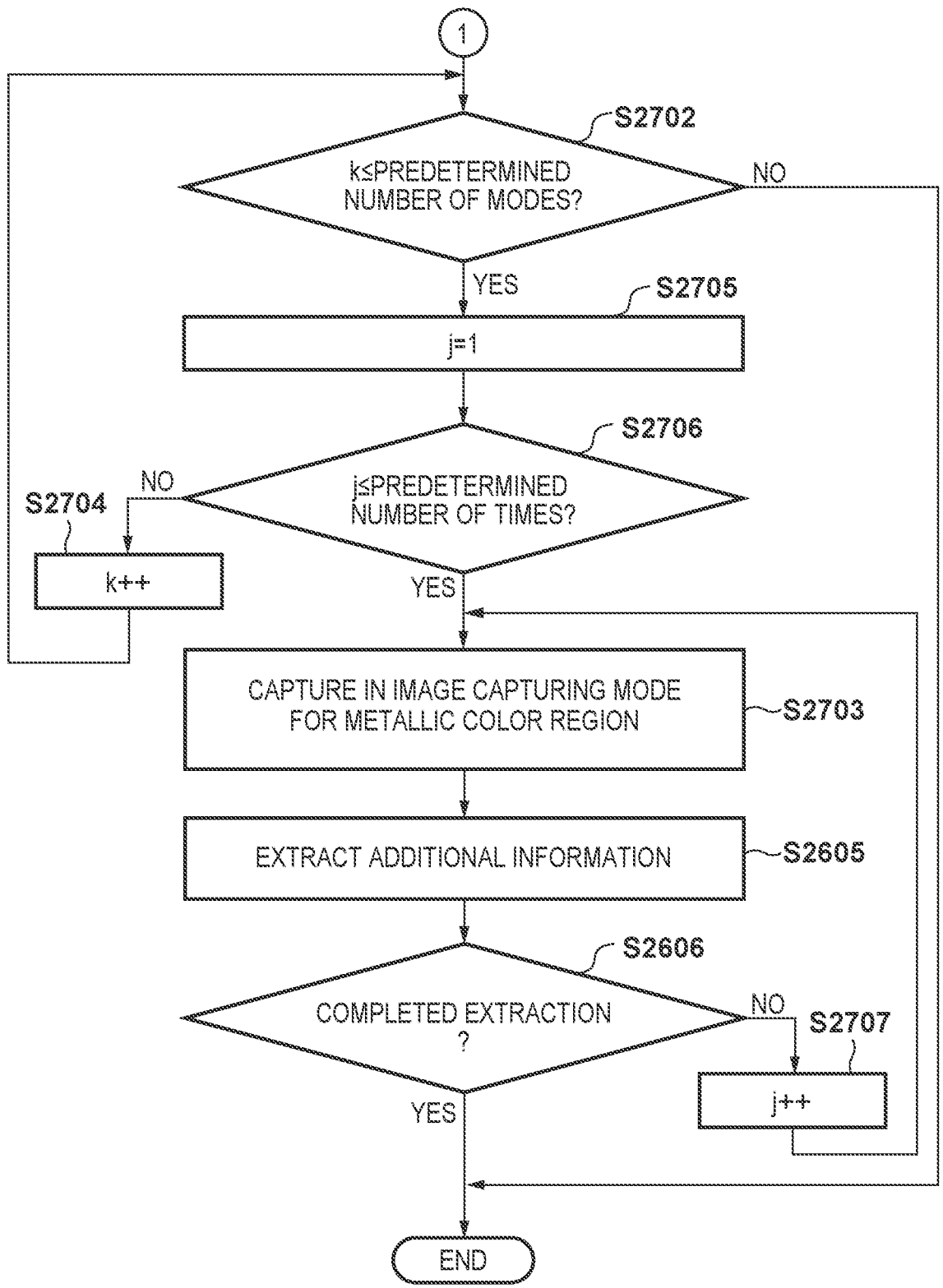

FIGS. 27A and 27B are flowcharts of multiplexing decoding processing in the present embodiment. The differences from FIG. 26B described above are step S2701 to step S2707. By adding step S2705, step S2706, and step S2707, image capturing by an image capturing mode for one metallic color region will be repeated a predetermined number of times. Here, when additional information is extracted, the multiplexing decoding processing is terminated. If additional information is not extracted, the image capturing mode k for a metallic color region is changed to a setting that accords with a value of k in step S2701, step S2702, step S2703, and step S2704, and then image capturing is performed. Here, when additional information is extracted, the multiplexing decoding processing is terminated. If additional information is not extracted, the image capturing mode for a metallic color region is further changed, and image capturing and extraction processing are repeated.

By the above, it is possible to appropriately extract embedded additional information from a plurality of metallic color regions having different reflection intensities, in addition to a color region.

Third Embodiment

In the second embodiment, it is possible to appropriately extract embedded additional information from a plurality of metallic color regions having different reflection intensities, in addition to the color region, but at the same time, the number of times of image capturing for multiplexing decoding processing is increased, processing time becomes longer.

To solve this issue, an image capturing condition for a related metallic color region need only be included in additional information embedded in a color region at the time of multiplexing encoding processing. A color region and a metallic color region being related refers to a case where the color region and the metallic color region exist on the same printing medium, or a case where a printing medium having only a color region and a printing medium having only a metallic color region are in a serial set.

In the present embodiment, a description will be given for an example in which an image capturing mode of a metallic color region is determined based on information on the image capturing condition of a metallic color region included in additional information extracted from a color region during multiplexing decoding processing.

Figure 28:
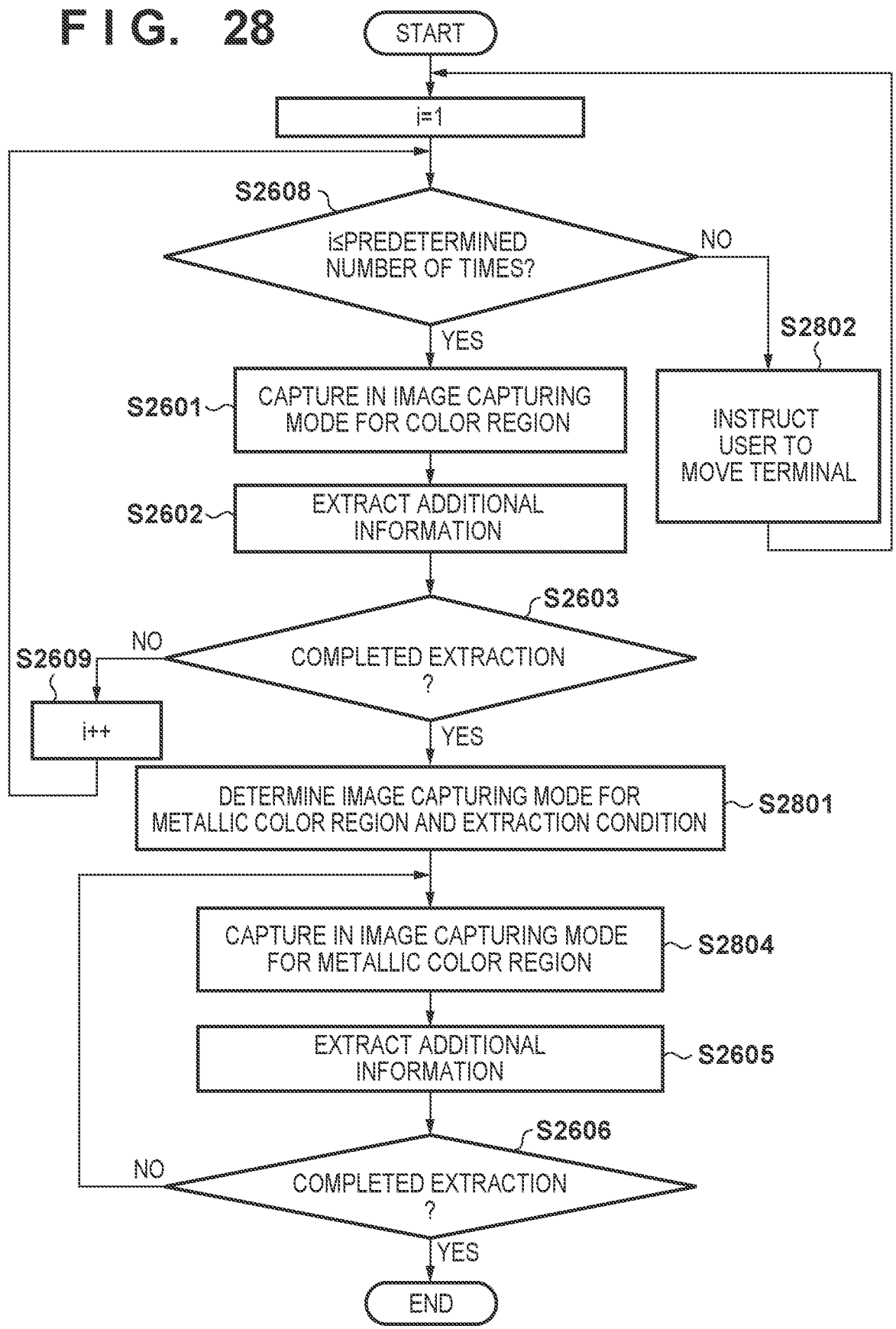
FIG. 28 is a flowchart of multiplexing decoding processing of a third embodiment.

FIG. 28 is a flowchart of multiplexing decoding processing in the present embodiment. The differences from FIG. 26B are step S2801 and step S2802. In step S2801, an image capturing mode for a metallic color region is determined based on additional information extracted in step S2602. In addition, when additional information embedded in a color region cannot be extracted, in step S2802, the user is instructed to move a terminal in order to change an extraction target region.

By the above, an image capturing mode of a metallic color region is determined based on information on the image capturing condition of a metallic color region included in additional information extracted from a color region. In this way, additional information embedded in a color region and a metallic color region can each be extracted without making the processing time redundant.

Since it is prompted to move the terminal in step S2801, the procedure of FIG. 28 is applicable only to a portable apparatus such as camera-equipped mobile terminal. In a case of a scan-equipped apparatus, an attempt can be made to extract additional information for the entire sheet; therefore, for such an apparatus, the procedure may be such that step S2608 and step S2802 are not performed. That is, the procedure may be such that step S2801 is added to FIG. 26A.

In the above-described first to third embodiments, the luminous flux of the light 212 is controlled in accordance with the reflectivity of a medium on which an image is formed, but exposure may be controlled if the exposure of the camera 202 is controllable. In this case, contrary to the luminous flux of light, the exposure is lowered when capturing a metallic color region, and the exposure is increased when capturing a non-metallic color region.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-122663, filed Jul. 27, 2021 which is hereby incorporated by reference herein in its entirety.

What is claimed is:

1. An apparatus comprising:
at least one processor;
at least one memory storing at least one program;
a light source; and
a capturing unit configured to acquire data by capturing an image formed on a medium, wherein
the program, when executed by the processor, causes the processor to:
adjust a light amount of the light source to a light amount that accords with a reflection intensity of the medium on which the image is formed, the reflection intensity being determined by at least one of whether there is the image formed using metallic color ink and a type of the medium,
capture the image, and
extract information multiplexed in the image from the image.

2. The apparatus according to claim 1, wherein the program causes the processor to:
adjust the light amount of the light source to a light amount that accords with each of a plurality of reflection intensities by an adjustment unit,
capture the image at the light amount that accords with each of the plurality of reflection intensities by the capturing unit, and
extract information from each image.

3. The apparatus according to claim 2, wherein the program causes the processor to:
capture the image by the capturing unit for each adjustment of the light source to a different light amount by the adjustment unit, and
extract information by an extraction unit.

4. The apparatus according to claim 1, wherein
the program causes the processor to:
adjust the light source to a first light amount by an adjustment unit,
capture the image by the capturing unit,
extract information by an extraction unit, and
adjust the light amount of the light source to a second light amount that is smaller than the first light amount.

5. The apparatus according to claim 4, wherein
the program causes the processor to:
adjust the light source such that the first light amount is made to be a light amount at which a luminance of an image captured by the capturing unit is saturated in a region of an image formed using metallic color ink and is not saturated in another region, and the second light amount is made to be a light amount that is not saturated in a region of an image formed using metallic color ink, and
capture the image by the capturing unit.

6. The apparatus according to claim 4, wherein the program causes the processor to determine the second light amount based on information extracted from the image captured at the first light amount.

7. The apparatus according to claim 4, wherein
the program causes the processor to:
adjust the light source to the first light amount by the adjustment unit,
capture the image by the capturing unit,
extract the information by the extraction unit, and
in a case where the information is extracted or a case where the information is not extracted after a predetermined number of attempts, adjust the light amount of the light source to a second light amount that is smaller than the first light amount.

8. A non-transitory computer readable medium storing at least one program, when executed by a computer comprising a light source, an adjustment unit configured to adjust a light amount of the light source, and a capturing unit configured to acquire image data by capturing an image formed on a medium, causes the computer to:
adjust the light amount of the light source to a light amount that accords with a reflection intensity of the medium on which the image is formed, the reflection intensity being determined by at least one of whether there is the image formed using metallic color ink and a type of the medium, capture the image, and extract information multiplexed in the image from the image.

9. The non-transitory computer readable medium according to claim 8, wherein the at least program causes the computer to:

adjust the light amount of the light source to a light amount that accords with each of a plurality of reflection intensities by an adjustment unit, capture the image at the light amount that accords with each of the plurality of reflection intensities by the capturing unit, and extract information from each image.

10. The non-transitory computer readable medium according to claim 8, wherein the at least program causes the computer to:

capture the image by the capturing unit for each adjustment of the light source to a different light amount by the adjustment unit, and extract information by an extraction unit.

11. The non-transitory computer readable medium according to claim 8, wherein the at least program causes the computer to:

adjust the light source to a first light amount by an adjustment unit, capture the image by the capturing unit, extract information by an extraction unit, and adjust the light amount of the light source to a second light amount that is smaller than the first light amount.

12. The non-transitory computer readable medium according to claim 11, wherein the at least program causes the computer to:

adjust the light source such that the first light amount is made to be a light amount at which a luminance of an image captured by the capturing unit is saturated in a region of an image formed using metallic color ink and is not saturated in another region, and the second light amount is made to be a light amount that is not saturated in a region of an image formed using metallic color ink, and capture the image by the capturing unit.

13. A method by an apparatus comprising:

a light source;

an adjustment unit configured to adjust a light amount of the light source; and a capturing unit configured to acquire image data by capturing an image formed on a medium, the method comprising:

adjusting the light amount of the light source to a light amount that accords with a reflection intensity of the medium on which the image is formed, the reflection intensity being determined by at least one of whether there is the image formed using metallic color ink and a type of the medium, capturing the image, and extracting information multiplexed in the image from the image.

14. The method according to claim 13, further comprising:

adjusting the light amount of the light source to a light amount that accords with each of a plurality of reflection intensities;

capturing the image at the light amount that accords with each of the plurality of reflection intensities; and extracting information from each image.

15. The method according to claim 13, further comprising:

capturing the image for each adjustment of the light source to a different light amount, and extracting information.

16. The method according to claim 13, further comprising:

adjusting the light source to a first light amount;

capturing the image;

extracting information, and adjusting the light amount of the light source to a second light amount that is smaller than the first light amount.

17. The method according to claim 16, further comprising:

adjusting the light source such that the first light amount is made to be a light amount at which a luminance of an image captured by the capturing is saturated in a region of an image formed using metallic color ink and is not saturated in another region, and the second light amount is made to be a light amount that is not saturated in a region of an image formed using metallic color ink, and capturing the image.

* * * * *